(12) United States Patent
Oba

(10) Patent No.: US 10,471,818 B2
(45) Date of Patent: Nov. 12, 2019

(54) DRIVE DEVICE FOR HYBRID VEHICLE

(71) Applicant: Toyota Jidosha Kabushiki Kaisha, Toyota-shi, Aichi-ken (JP)

(72) Inventor: Hidehiro Oba, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 116 days.

(21) Appl. No.: 15/849,973

(22) Filed: Dec. 21, 2017

(65) Prior Publication Data
US 2018/0194214 A1   Jul. 12, 2018

(30) Foreign Application Priority Data
Jan. 10, 2017 (JP) ................. 2017-001730

(51) Int. Cl.
*B60K 6/36* (2007.10)
*B60K 6/365* (2007.10)
(Continued)

(52) U.S. Cl.
CPC .............. *B60K 6/365* (2013.01); *B60K 6/387* (2013.01); *B60K 6/442* (2013.01); *B60K 6/445* (2013.01); *F16H 3/727* (2013.01); *B60Y 2200/92* (2013.01); *B60Y 2400/42* (2013.01); *B60Y 2400/73* (2013.01); *F16H 2200/0043* (2013.01);
(Continued)

(58) Field of Classification Search
CPC ........ B60K 6/365; B60K 6/387; B60K 6/442; B60K 6/445; B60Y 2200/92; B60Y 2400/42; B60Y 2400/73; Y02T 10/6234; Y02T 10/6239; Y02T 10/7077; Y10S 903/91; Y10S 903/914; F16H 2200/0043; F16H 2200/2005; F16H 2200/2007; F16H 2200/2023; F16H 2200/2025;
(Continued)

(56) References Cited

U.S. PATENT DOCUMENTS

| 6,962,545 B2 * | 11/2005 | Larkin | B60K 6/365 475/5 |
| 7,267,630 B2 * | 9/2007 | Tabata | F16H 3/66 475/275 |

(Continued)

FOREIGN PATENT DOCUMENTS

| JP | 2004-345527 A | 12/2004 |
| JP | 2006-077857 A | 3/2006 |

(Continued)

*Primary Examiner* — Leslie A Nicholson, III
(74) *Attorney, Agent, or Firm* — Dinsmore & Shohl LLP

(57) ABSTRACT

A drive device is equipped with a countershaft, an engine, a first MG, a second MG, and a Ravigneaux-type planetary gear unit that includes a ring gear, a pinion, a carrier, a first sun gear, and a second sun gear. The pinion includes a first tooth portion that meshes with the ring gear and the first sun gear, and a second tooth portion that is provided at a position offset from the first tooth portion in an axial direction of the pinion and that meshes with the second sun gear. The drive device is further equipped with a first clutch that changes over a state of connection between the first sun gear and the engine, a second clutch that changes over a state of connection between the carrier and the engine, and a first brake that changes over a state of fixation of the second sun gear to a case.

8 Claims, 16 Drawing Sheets

(51) Int. Cl.
*F16H 3/72* (2006.01)
*B60K 6/442* (2007.10)
*B60K 6/387* (2007.10)
*B60K 6/445* (2007.10)

(52) U.S. Cl.
CPC ........... *F16H 2200/2005* (2013.01); *F16H 2200/2007* (2013.01); *F16H 2200/2023* (2013.01); *F16H 2200/2025* (2013.01); *F16H 2200/2038* (2013.01); *F16H 2200/2041* (2013.01); *F16H 2200/2043* (2013.01); *F16H 2200/2046* (2013.01); *Y02T 10/6234* (2013.01); *Y02T 10/6239* (2013.01); *Y02T 10/7077* (2013.01); *Y10S 903/91* (2013.01); *Y10S 903/914* (2013.01)

(58) Field of Classification Search
CPC ..... F16H 2200/2038; F16H 2200/2041; F16H 2200/2046
USPC .......................................................... 475/5
See application file for complete search history.

(56) References Cited

U.S. PATENT DOCUMENTS

| | | | | |
|---|---|---|---|---|
| 7,335,124 B2 * | 2/2008 | Yatabe | ............... | B60K 6/445 475/5 |
| 7,393,296 B2 * | 7/2008 | Kano | ............... | B60K 6/365 475/10 |
| 7,517,297 B2 * | 4/2009 | Tabata | ............... | F16H 3/66 475/276 |
| 7,690,455 B2 * | 4/2010 | Kano | ............... | B60K 6/405 180/65.235 |
| 8,591,361 B2 * | 11/2013 | Hisada | ............... | B60K 6/387 180/65.235 |
| 8,647,230 B2 * | 2/2014 | Akutsu | ............... | B60K 6/387 477/4 |
| 8,721,482 B2 * | 5/2014 | Takami | ............... | B60K 6/445 475/282 |
| 8,771,130 B2 * | 7/2014 | Ando | ............... | F16H 3/62 475/276 |
| 9,002,560 B2 * | 4/2015 | Hasegawa | ............... | B60K 6/445 701/22 |
| 9,108,624 B2 * | 8/2015 | Xue | ............... | B60K 6/445 |
| 9,340,101 B2 * | 5/2016 | Meiβner et al. | ............... | F16H 3/725 |
| 9,428,179 B2 * | 8/2016 | Kato | ............... | B60W 20/10 |
| 9,649,926 B2 * | 5/2017 | Kato | ............... | B60W 20/10 |
| 10,017,040 B2 * | 7/2018 | Hata | ............... | B60K 6/365 |
| 10,059,182 B2 * | 8/2018 | Facchinello | ............... | B60J 7/106 |
| 10,100,925 B2 * | 10/2018 | Horiike | ............... | F16H 61/0437 |
| 10,160,305 B2 * | 12/2018 | Kasuya | ............... | B60K 6/26 |
| 10,220,834 B2 * | 3/2019 | Hashimoto | ............... | B60K 6/26 |
| 10,286,898 B2 * | 5/2019 | Ono | ............... | B60K 6/383 |
| 2009/0065274 A1 * | 3/2009 | Kano | ............... | B60L 50/16 180/65.21 |
| 2009/0075774 A1 * | 3/2009 | Tabata | ............... | B60W 20/30 475/150 |
| 2010/0051360 A1 * | 3/2010 | Oba | ............... | B60L 50/16 180/65.22 |
| 2012/0122629 A1 * | 5/2012 | Akutsu | ............... | B60L 50/16 477/3 |
| 2013/0331216 A1 | 12/2013 | Tuckfield et al. | | |
| 2018/0178779 A1 * | 6/2018 | Inagawa | ............... | B60K 6/445 |

FOREIGN PATENT DOCUMENTS

JP  2012-035661 A  2/2012
JP  2014-105826 A  6/2014

* cited by examiner

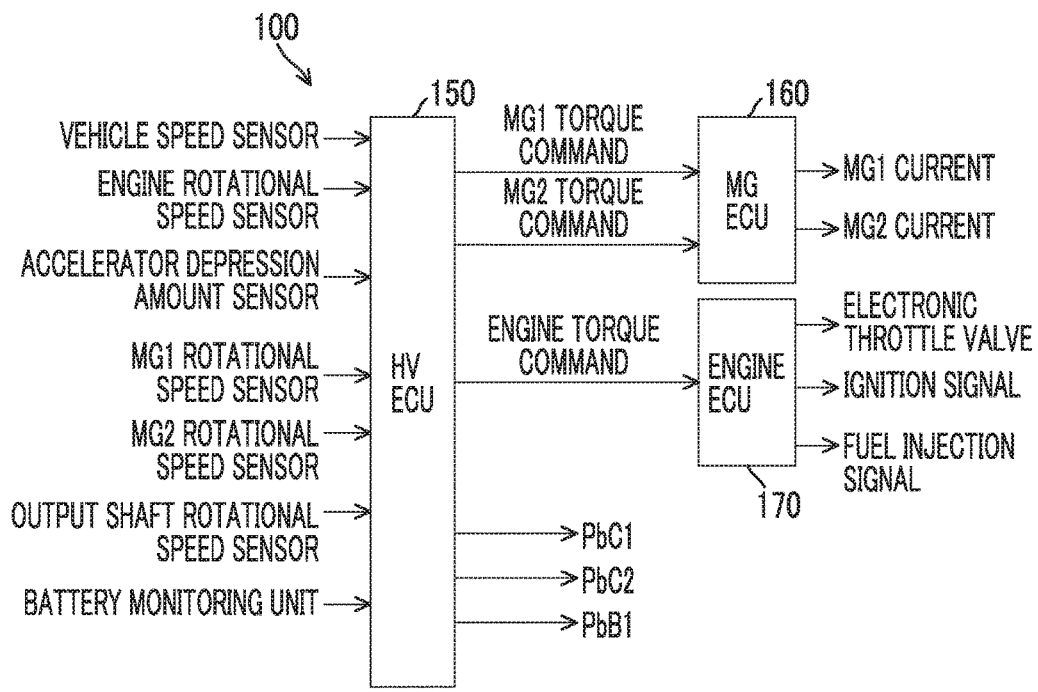

EV RUNNING MODE (MG2 SINGLE DRIVE)

EV RUNNING MODE (MG1/MG2 DOUBLE DRIVE)

SERIES RUNNING MODE

SERIES/PARALLEL RUNNING MODE

PARALLEL RUNNING MODE (FIRST SPEED)

PARALLEL RUNNING MODE (SECOND SPEED)

PARALLEL RUNNING MODE (THIRD SPEED)

PARALLEL RUNNING MODE (FOURTH SPEED)

| RUNNING MODE | | C1 | C2 | C3 | B1 | MG1 ELECTRIC LOCK |
|---|---|---|---|---|---|---|
| EV RUNNING MODE | MG2 SINGLE DRIVE | ○ | | ○ | | |
| | MG1/MG2 DOUBLE DRIVE | | | ○ | ○ | |
| HV RUNNING MODE | SERIES | | ○ | | ○ | |
| | SERIES/PARALLEL | | ○ | ○ | | |
| | PARALLEL FIRST SPEED | ○ | | ○ | ○ | |
| | PARALLEL SECOND SPEED | | ○ | ○ | ○ | |
| | PARALLEL THIRD SPEED | ○ | ○ | ○ | | |
| | PARALLEL FOURTH SPEED | | ○ | ○ | | ○ |

SERIES RUNNING MODE

| RUNNING MODE | | C1 | C2 | C3 | B1 | B2 | MG1 ELECTRIC LOCK |
|---|---|---|---|---|---|---|---|
| EV RUNNING MODE | MG2 SINGLE DRIVE | ○ | | ○ | | | |
| | MG1/MG2 DOUBLE DRIVE | | | ○ | ○ | | |
| HV RUNNING MODE | SERIES | | ○ | | | ○ | |
| | SERIES/PARALLEL | | ○ | ○ | | | |
| | PARALLEL FIRST SPEED | ○ | | ○ | ○ | | |
| | PARALLEL SECOND SPEED | | ○ | ○ | ○ | | |
| | PARALLEL THIRD SPEED | ○ | ○ | ○ | | | |
| | PARALLEL FOURTH SPEED | | ○ | ○ | | | ○ |

SERIES RUNNING MODE

SERIES RUNNING MODE

DRIVE DEVICE FOR HYBRID VEHICLE

CROSS-REFERENCE TO RELATED APPLICATIONS

This application claims priority to Japanese Patent Application No. 2017-001730 filed on Jan. 10, 2017, which is incorporated herein by reference in its entirety.

BACKGROUND

1. Technological Field

The present disclosure relates to a drive device for a hybrid vehicle.

2. Description of Related Art

Various drive devices for hybrid vehicles that are each equipped with a rotating electrical machine, an engine, and a planetary gear unit have been conventionally proposed.

For example, a drive device described in Japanese Patent Application Publication No. 2006-077857 (JP 2006-077857 A) includes an engine, a first rotating electrical machine, a second rotating electrical machine, a first planetary gear unit, a second planetary gear unit, a third planetary gear unit, a plurality of clutches, and a plurality of brakes.

In this drive device, a plurality of running modes can be set by changing over the clutches and the brakes.

SUMMARY

However, when a drive device is configured through the use of a plurality of sets of planetary gear units as is the case with the drive device described in Japanese Patent Application Publication No. 2006-077857 (JP 2006-077857 A), structural complication is caused, so the number of parts may increase. As a result, problems such as an increase in manufacturing cost, a deterioration in mountability resulting from the enlargement of size, an increase in weight, the complication of a lubrication mechanism, an increase in dragging loss, and the like are caused. Furthermore, the range of the speed ratio to which the drive device can be shifted is set while avoiding the attainment of a high rotation state by a plurality of sets of the pinions in the plurality of the sets of the planetary gear units. Therefore, the degree of freedom in setting the speed ratio may be adversely affected.

The present disclosure has been made in view of the above-mentioned problems. The present disclosure provides a drive device for a hybrid vehicle that is simple in configuration and space-saving, while avoiding the attainment of a high rotation state by pinions of a planetary gear unit.

Thus, according to one aspect of the present disclosure, there is provided a drive device for a hybrid vehicle. The drive device is equipped with a drive shaft, an engine, a first rotating electrical machine, a second rotating electrical machine, a planetary gear unit, a first clutch, a second clutch, and a first brake. The drive shaft is connected to a driving wheel of the hybrid vehicle. The second rotating electrical machine is mechanically connected to the drive shaft. The planetary gear unit is a Ravigneaux-type planetary gear unit. Moreover, the planetary gear unit includes a first sun gear that is connected to the first rotating electrical machine, a second sun gear that is arranged such that a rotation center of the second sun gear coincides with a rotation center of the first sun gear, a ring gear that is mechanically connected to the drive shaft, a pinion that includes a first tooth portion and a second tooth portion and a carrier that is connected to the pinion. The first tooth portion meshes with the ring gear and the first sun gear. The second tooth portion is provided at a position offset from the first tooth portion in an axial direction of the pinion, and meshes with the second sun gear. The first clutch is configured to selectively make a changeover between a state in which the first sun gear and the engine are connected to each other and a state in which the first sun gear and the engine are not connected to each other. The second clutch is configured to selectively make a changeover between a state in which the carrier and the engine are connected to each other and a state in which the carrier and the engine are not connected to each other. The first brake is configured to selectively make a changeover between a state in which the second sun gear is fixed to a fixation member and a state in which the second sun gear is not fixed to the fixation member.

According to the drive device as described above, a plurality of running modes can be realized by controlling the rotation states of the first sun gear, the second sun gear, the carrier, and the ring gear through the use of the first clutch, the second clutch, and the first brake, while making the number of parts smaller than that of a drive device employing a plurality of sets of planetary gear units. Therefore, the increase in manufacturing cost, the enlargement of the size of the planetary gear unit, the increase in weight, and the increase in dragging loss can be suppressed. Besides, there is no need to provide a plurality of sets of pinions, so the attainment of a high rotation state by the pinion is easy to avoid in setting the range of the speed ratio. Therefore, the degree of freedom in setting the range of the speed ratio can be enhanced.

Besides, the drive device may further include a driven gear. The driven gear may mesh with the ring gear, and may be mechanically connected to the drive shaft. Besides, in this drive device, the second rotating electrical machine may be mechanically connected to the driven gear. Besides, this drive device may further include a third clutch. The third clutch may be configured to selectively make a changeover between a state in which the driven gear and the drive shaft are connected to each other and a state in which the driven gear and the drive shaft are not connected to each other.

According to the drive device as described above, a series running mode can be constituted by, for example, releasing the first clutch and the third clutch, engaging the second clutch, engaging the first brake, and causing the fixation member to fix the second sun gear. When the engine is driven in this state, an engine torque can be transmitted to the first rotating electrical machine from the carrier via the first sun gear. At this time, the engine torque that is received by the first rotating electrical machine can be made small, while making the rotational speed of the first rotating electrical machine higher than the rotational speed of the engine. Therefore, the first rotating electrical machine can be reduced in size.

Besides, the drive device may include a second brake. The second brake may be configured to selectively make a changeover between a state in which the ring gear is fixed to the fixation member and a state in which the ring gear is not fixed to the fixation member.

According to the drive device as described above, the series running mode can be constituted by, for example, releasing the first clutch and the third clutch, engaging the second clutch, engaging the second brake, and causing the fixation member to fix the ring gear. When the engine is driven in this state, an engine torque can be transmitted to the first rotating electrical machine from the carrier via the first sun gear. At this time, the engine torque that is received by the first rotating electrical machine can be made small, while making the rotational speed of the first rotating electrical machine higher than the rotational speed of the engine. Therefore, the first rotating electrical machine can be reduced in size.

Besides, the drive device may further include a hollow shaft, a connection shaft and a propeller shaft. The hollow shaft may be configured to connect the first rotating electrical machine and the first sun gear to each other. The hollow shaft may be hollow. The connection shaft may be passed through an interior of the hollow shaft, and may be connected to the carrier. The propeller shaft may be mechanically connected to the drive shaft. Moreover, the first clutch may be configured to selectively make a changeover between a state in which the first sun gear and the engine are connected to each other via the hollow shaft and a state in which the first sun gear and the engine are not connected to each other via the hollow shaft. The second clutch may be configured to selectively make a changeover between a state in which the carrier and the engine are connected to each other via the connection shaft and a state in which the carrier and the engine are not connected to each other via the connection shaft. The propeller shaft and the connection shaft may be arranged such that a center of an axis of the propeller shaft coincides with a center of an axis of the connection shaft.

According to the drive device as described above, the engine, the first rotating electrical machine, the planetary gear unit, and the second rotating electrical machine can be arranged in this sequence. Therefore, the drive device can be configured to suit a front-engine/rear-drive (FR) vehicle.

Besides, the drive device may further include a third clutch. The third clutch may be configured to selectively make a changeover between a state in which the ring gear and the drive shaft are connected to each other and a state in which the ring gear and the drive shaft are not connected to each other.

According to the drive device as described above, the engine torque that is received by the first rotating electrical machine can be made small, for example, while making the rotational speed of the first rotating electrical machine higher than the rotational speed of the engine when the series running mode is constituted. Therefore, the first rotating electrical machine can be reduced in size.

Besides, the drive device may further include a second brake. The second brake may be configured to selectively make a changeover between a state in which the ring gear is fixed to the fixation member and a state in which the ring gear is not fixed to the fixation member.

According to the drive device as described above, the engine torque that is received by the first rotating electrical machine can be made small, for example, while making the rotational speed of the first rotating electrical machine higher than the rotational speed of the engine when the series running mode is constituted. Therefore, the first rotating electrical machine can be reduced in size.

The present disclosure can provide a drive device for a hybrid vehicle that is simple in configuration and space-saving, while avoiding the attainment of a high rotation state by a pinion of a planetary gear unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram showing an exemplary configuration of a control device shown in FIG. 1;

FIG. 3 is an engagement chart showing control states of clutches and a brake corresponding to respective running modes in the first embodiment of the disclosure;

DETAILED DESCRIPTION OF EMBODIMENTS

The embodiments of the present disclosure will be described hereinafter in detail with reference to the drawings. Incidentally, like or equivalent components are denoted by like reference symbols, and the description thereof will not be repeated.

Figure 1:
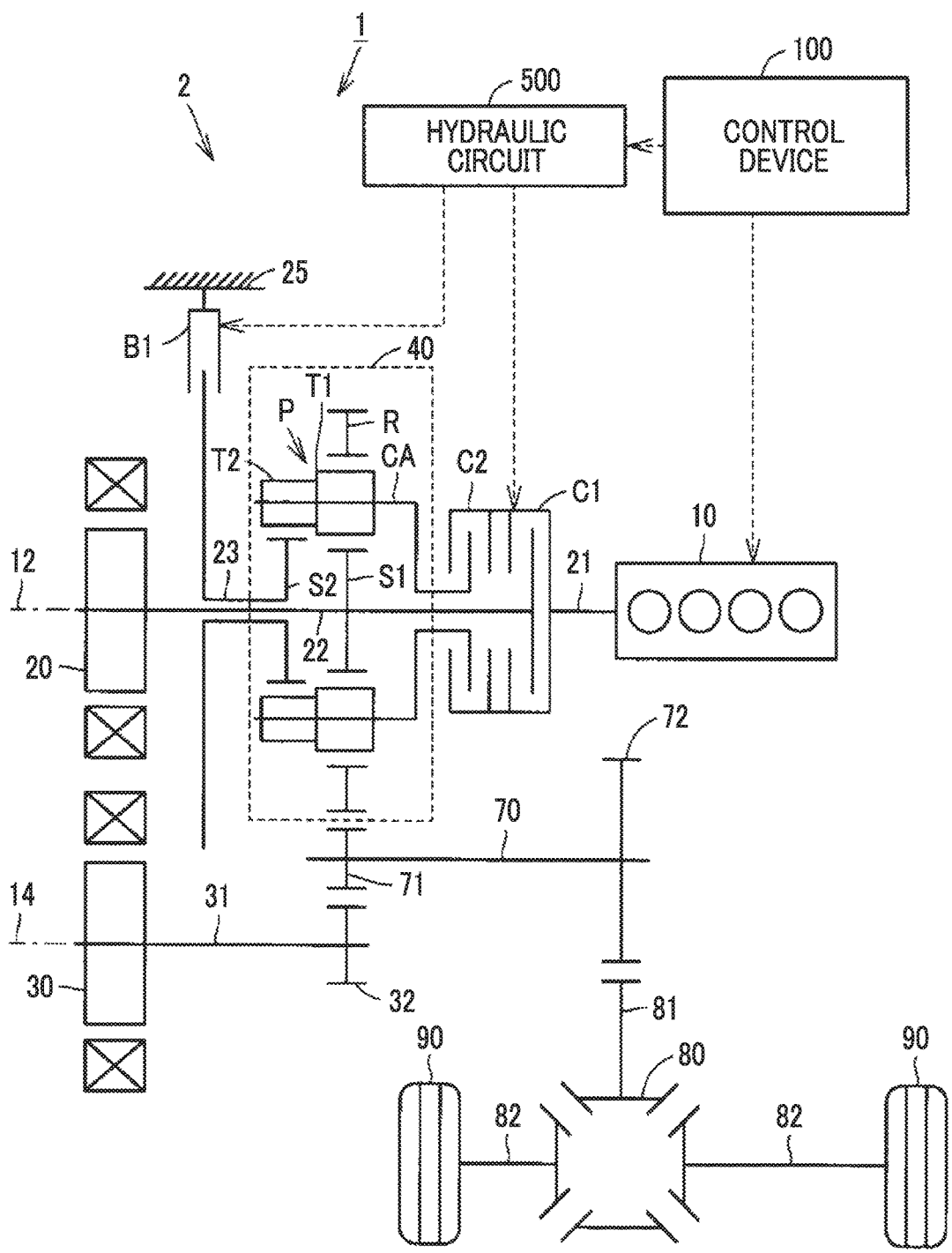
FIG. 1 is a view showing an example of the general configuration of a vehicle in the first embodiment of the disclosure.

FIG. 1 is a view schematically showing an example of the general configuration of a vehicle 1 in the first embodiment of the disclosure. The vehicle 1 is a hybrid vehicle that includes a drive device 2, driving wheels 90, a control device 100, and a hydraulic circuit 500. The drive device 2 includes an engine 10, a first rotating electrical machine (a first MG, which is also referred to as an MG1) 20, a second rotating electrical machine (a second MG, which is also referred to as an MG2) 30, a gearshift unit constituted by a planetary gear unit 40, a first clutch C1, a second clutch C2, and a first brake B1.

The vehicle 1 runs through the use of the motive power of at least one of the engine 10, the first MG 20, and the second MG 30. Incidentally, the vehicle 1 may be a plug-in hybrid vehicle that can be charged by an external electric power supply.

Moreover, the drive device 2 according to the first embodiment of the disclosure can operate in a so-called EV running mode, a so-called series running mode, a so-called series/parallel running mode, and a so-called parallel running mode by controlling engagement states of the first clutch C1, the second clutch C2, and the first brake B1, and the driving of the first MG 20, the second MG 30, and the engine 10.

The engine 10 is, for example, an internal combustion engine such as a gasoline engine, a diesel engine or the like.

Each of the first MG 20 and the second MG 30 includes a stator, and a rotor that is provided rotatably with respect to the stator. A permanent magnet is embedded in the rotor. A rotary shaft 22 is fixed to the rotor of the first MG 20, and a rotary shaft 31 is fixed to the rotor of the second MG 30. Incidentally, the rotary shaft 22 is arranged on a first axis 12, and the rotary shaft 31 is arranged on a second axis 14 that is parallel to the first axis 12.

The first brake B1, the first MG 20, the planetary gear unit 40, the second clutch C2, the first clutch C1, and the engine 10 are arranged in this order on the first axis 12.

The planetary gear unit 40 is a Ravigneaux-type planetary gear unit. The planetary gear unit 40 includes a first sun gear S1, a plurality of pinions P, a carrier CA that connects the pinions P to one another, a ring gear R, and a second sun gear S2.

The first sun gear S1 is fixed to the rotary shaft 22, and is provided rotatably around the first axis 12. The ring gear R is provided on outer peripheral sides of the pinions P, and is arranged such that a rotation center thereof is coaxial with the first axis 12.

The second sun gear S2 is arranged such that a rotation center thereof coincides with a rotation center of the first sun gear S1 (i.e., such that the rotation center thereof is coaxial with the first axis 12). The second sun gear S2 is fixed to one end of a hollow shaft 23 that is hollow. The rotary shaft 22 is passed through the interior of the hollow shaft 23. A component member of the first brake B1 is fixed to the other end of the hollow shaft.

Each of the pinions P includes a first tooth portion T1 and a second tooth portion T2. The first tooth portion T1 is arranged between the first sun gear S1 and the ring gear R, and meshes with the first sun gear S1 and the ring gear R. The second tooth portion T2 is provided at a position offset in an axial direction of each of the pinions P (in a leftward direction on the sheet of FIG. 1), and meshes with the second sun gear S2. Incidentally, the second sun gear S2 and the second tooth portion T2 may mesh with each other via still another pinion.

The carrier CA is provided rotatably around the first axis 12. The carrier CA rotatably supports each of the plurality of the pinions P.

In an alignment chart that will be described later, there is established a relationship in which the rotational speed of the first sun gear S1, the rotational speed of the carrier CA, the rotational speed of the ring gear R, and the rotational speed of the second sun gear S2 are linked with one another by a straight line (a relationship in which if the rotational speeds of two of the first sun gear S1, the carrier CA, the ring gear R, and the second sun gear S2 are determined, the other rotational speeds are also determined).

The first brake B1 is a hydraulic frictional engagement element that can keep the second sun gear S2 from rotating. The first brake B1 is provided between a case 25 and the other end of the hollow shaft 23. When the first brake B1 is engaged, the second sun gear S2 is kept from rotating by the case 25, and the rotational speed of the second sun gear S2 becomes equal to zero (the second sun gear S2 is fixed). When the first brake B1 is released, the second sun gear S2 is allowed to rotate.

The first clutch C1 is a hydraulic frictional engagement element that can couple the rotary shaft 22 and a crankshaft 21 of the engine 10 to each other. When the first clutch C1 is engaged, the rotary shaft 22 and the crankshaft 21 are coupled to each other to form a motive power transmission path from the engine 10 to the first MG 20. Therefore, the motive power of the engine 10 can be directly transmitted to the first MG 20.

When the first clutch C1 is released, the crankshaft 21 of the engine 10 is stopped from being coupled to the rotary shaft 22. Therefore, the motive power from the engine 10 cannot be directly transmitted to the first MG 20.

The second clutch C2 is a hydraulic frictional engagement element that can couple the crankshaft 21 and the carrier CA to each other. When the second clutch C2 is engaged, the crankshaft 21 and the carrier CA are coupled to each other, and rotate integrally with each other. When the second clutch C2 is released, the carrier CA is stopped from being coupled to the crankshaft 21.

An outer peripheral tooth is formed on an outer peripheral surface of the ring gear R. This outer peripheral tooth meshes with a driven gear 71. The driven gear 71 is fixed to one end side of a countershaft 70. The countershaft 70 is arranged parallel to the first axis 12 and the second axis 14. A drive gear 72 is provided on the other end side of the countershaft 70. The drive gear 72 meshes with a differential ring gear 81 of a differential gear set 80. A drive shaft 82 is connected to the differential gear set 80, and the driving wheels 90 are connected to the drive shaft 82. Therefore, rotation of the countershaft 70 is transmitted to the driving wheels 90 through the differential gear set 80.

Therefore, the motive power from the engine 10 and the first MG 20 is transmitted to the countershaft 70 through the planetary gear unit 40 and the driven gear 71.

A reduction gear 32 is fixed to the rotary shaft 31 of the second MG 30. The reduction gear 32 meshes with the driven gear 71. Therefore, the motive power from the second MG 30 is transmitted to the countershaft 70 through the reduction gear 32.

The hydraulic circuit 500 supplies hydraulic oil to at least one of the first clutch C1, the second clutch C2, and the first brake B1 in accordance with a control signal from the control device 100. The control device 100 generates a control signal for controlling the first clutch C1, the second clutch C2, and the first brake B1 in accordance with a selected one of a plurality of running modes that will be described later, and transmits the control signal to the hydraulic circuit 500.

FIG. 2 is a block diagram showing an example of the configuration of the control device 100 shown in FIG. 1. The control device 100 includes an HV electronic control unit (ECU) 150, an MG ECU 160, and an engine ECU 170. Each of the HV ECU 150, the MG ECU 160, and the engine ECU 170 is configured to include a computer.

The MG ECU 160 adjusts the value of a current that is supplied to the first MG 20 based on an MG1 torque command from the HV ECU 150, and controls the output of the first MG 20. Besides, the MG ECU 160 adjusts the value of a current that is supplied to the second MG 30 based on an MG2 torque command from the HV ECU 150, and controls the output of the second MG 30.

The engine ECU 170 controls the output of the engine 10 by controlling the opening degree of an electronic throttle valve of the engine 10, the ignition timing of the engine 10, the fuel injection amount of the engine 10 and the like, based on an engine torque command from the HV ECU 150.

The HV ECU 150 comprehensively controls the entire vehicle. A vehicle speed sensor, an accelerator depression amount sensor, an engine rotational speed sensor, an MG1 rotational speed sensor, an MG2 rotational speed sensor, an output shaft rotational speed sensor, a battery monitoring unit and the like are connected to the HV ECU 150. Due to inputs from these components, the HV ECU 150 acquires a vehicle speed, an accelerator depression amount, a rotational speed of the engine 10, a rotational speed of the first MG 20, a rotational speed of the second MG 30, a rotational speed of an output shaft (the countershaft 70) of a motive power transmission device, a state of a battery for driving (not shown), and the like.

The HV ECU 150 calculates required values such as a drive force required of the vehicle, a power required of the vehicle, a torque required of the vehicle, and the like, based on the acquired information. The HV ECU 150 determines a torque command value for the first MG 20, a torque command value for the second MG 30, and a torque command value for the engine 10, based on the calculated required values. The HV ECU 150 outputs the torque command value for the first MG 20 and the torque command value for the second MG 30 to the MG ECU 160. Besides, the HV ECU 150 outputs the torque command value for the engine 10 to the engine ECU 170.

The HV ECU 150 outputs command values (PbC1 and PbC2) for hydraulic pressures supplied to the first clutch C1 and the second clutch C2 respectively, and a command value (PbB1) for a hydraulic pressure supplied to the first brake B1, to the hydraulic circuit 500 of FIG. 1. The hydraulic circuit 500 supplies hydraulic pressures corresponding to the command values PbC1, PbC2, and PbB1 to the first clutch C1, the second clutch C2, and the first brake B1 respectively. Thus, the states (engagement/release) of the first clutch C1, the second clutch C2, and the first brake B1 are changed over.

Incidentally, in FIG. 2, an example in which the control device 100 is constituted of three ECU's, namely, the HV ECU 150, the MG ECU 160, and the engine ECU 170 is shown. However, the number of ECU's is not absolutely required to be three. For example, the control device 100 may be constituted of two, four or more ECU's.

Besides, the HV ECU 150, the MG ECU 160, and the engine ECU 170 may be integrated into a single ECU. The following description will be given on the assumption that the control device 100 mainly performs various kinds of control and mainly receives information from various sensor groups, without distinguishing the HV ECU 150, the MG ECU 160 and the engine ECU 170 from one another.

Next, running modes of the vehicle 1 will be described in detail. The running modes of the vehicle 1 include a motor running mode (hereinafter referred to as "an EV running mode") and a hybrid running mode (hereinafter referred to as "an HV running mode").

The EV running mode is a mode in which the engine 10 is stopped and the vehicle 1 is caused to run by the motive power of at least one of the first MG 20 and the second MG 30. In the present embodiment of the disclosure, the EV running mode includes "an MG2 single drive mode" in which the motive power of only the second MG 30 is used, and "an MG1/MG2 double drive mode" in which both the motive power of the first MG 20 and the motive power of the second MG 30 are used.

The HV running mode is a mode in which the engine 10 is operated and the vehicle 1 is caused to run by the motive power of the engine 10 and the motive power of at least one of the first MG 20 and the second MG 30. In the present embodiment of the disclosure, the HV running mode includes a series running mode (hereinafter also referred to simply as "a series mode"), a series/parallel running mode (hereinafter also referred to simply as "a series/parallel mode"), and a parallel running mode (hereinafter also referred to simply as "a parallel mode").

In the series mode, the entire motive power of the engine 10 is converted into the electric power transmitted to the first MG 20, and the second MG 30 is driven by the electric power.

In the series/parallel mode, part of the motive power of the engine 10 is mechanically transmitted to the countershaft 70, and the remaining motive power is transmitted to the first MG 20 and converted into electric power. The second MG 30 is driven by the electric power.

In the parallel mode, the motive power of the engine 10 is mechanically transmitted to the countershaft 70, and the motive power of at least one of the first MG 20 and the second MG 30 is transmitted to the countershaft 70 if necessary.

Incidentally, in any of the series mode, the series/parallel mode, and the parallel mode, it is also possible to charge the battery for driving with the electric power that is generated by at least one of the first MG 20 and the second MG 30 if necessary.

Next, the control state during each of the running modes will be described. The control device 100 selects one of the aforementioned plurality of running modes by controlling control states (engagement/release) of the first clutch C1, the second clutch C2, and the first brake B1 and the operation of the engine 10, the first MG 20, and the second MG 30.

FIG. 3 is an engagement chart showing control states of the first clutch C1, the second clutch C2, and the first brake B1 in each of the running modes. In FIG. 3, "C1", "C2", "B1", "MG1", and "MG2" denote the first clutch C1, the second clutch C2, the first brake B1, the first MG 20, and the second MG 30 respectively. Each circle in the columns of "C1", "C2", and "B1" indicates "engagement", and each blank indicates "release". Incidentally, "MG1 electric lock" will be described later.

The operation of the vehicle 1 during each of the running modes will be described through the use of alignment charts shown in FIGS. 4 to 11.

In the alignment charts shown in FIGS. 4 to 11, "Sun 1", "Sun 2", "Car", "Ring", "ENG", "MG1", "MG2", "B1", and "OUT" denote the first sun gear S1, the second sun gear S2, the carrier CA, the ring gear R, the engine 10, the first MG 20, the second MG 30, the first brake B1, and the countershaft 70 respectively.

Figure 4:
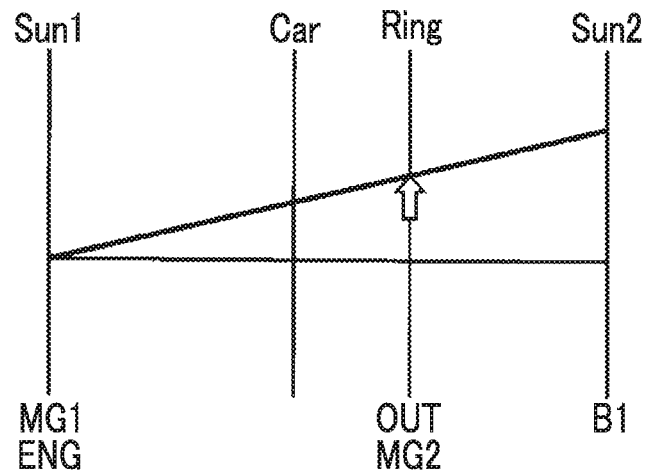
FIG. 4 is an alignment chart during an MG2 single drive mode shown in FIG. 1.

FIG. 4 is an alignment chart during the MG2 single drive mode. During the MG2 single drive mode, the first clutch C1 is engaged, and the second clutch C2 and the first brake B1 are released. In this state, the control device 100 stops the engine 10, and operates the second MG 30 as a motor. Thus, the first sun gear S1 that is coupled to the crankshaft 21 of the engine 10 does not rotate. On the other hand, the ring gear R is not kept from rotating, so the countershaft 70 rotates in accordance with the torque of the second MG 30.

Figure 5:
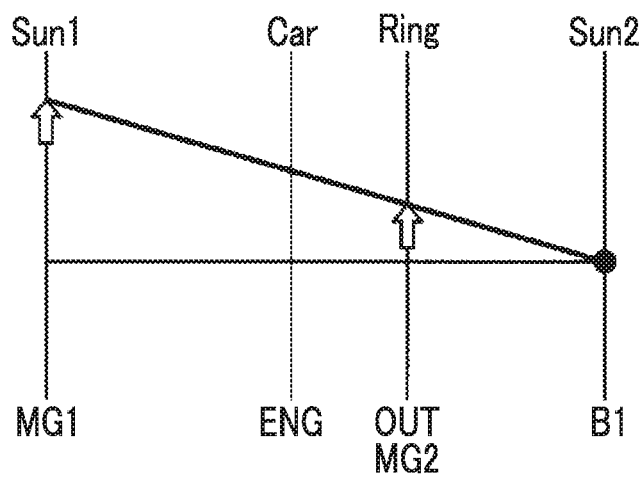
FIG. 5 is an alignment chart during an MG1/MG2 double drive mode shown in FIG. 1.

FIG. 5 is an alignment chart during the MG1/MG2 double drive mode. During the MG1/MG2 double drive mode, the first brake B1 is engaged, and the second clutch C2 and the first brake B1 are released. In this state, the control device 100 stops the engine 10, and operates the first MG 20 and the second MG 30 as motors. Due to engagement of the first brake B1, the second sun gear S2 is kept from rotating. Therefore, the torque of the first MG 20 is transmitted to the ring gear R (the countershaft 70) with the second sun gear S2 serving as a fulcrum. Furthermore, the torque of the second MG 30 is also transmitted to the countershaft 70.

Figure 6:
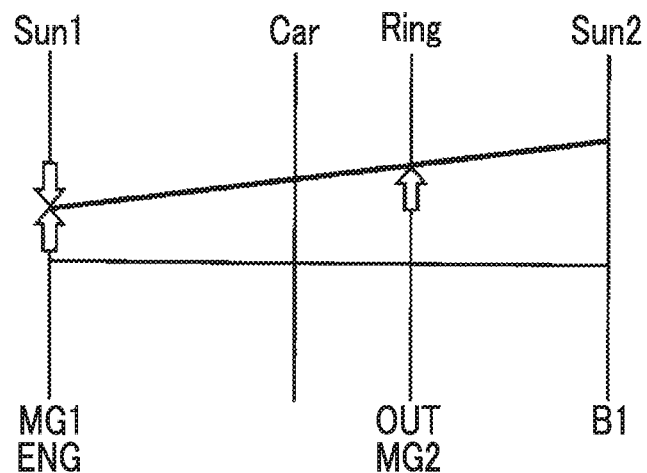
FIG. 6 is an alignment chart during a series running mode in the first embodiment of the disclosure.

FIG. 6 is an alignment chart during the series mode. During the series mode, the first clutch C1 is engaged, and the second clutch C2 and the first brake B1 are released. Due to engagement of the first clutch C1, the crankshaft 21 of the engine 10 is coupled to the first MG 20. Due to release of the second clutch C2 and the first brake B1, the carrier CA and the second sun gear S2 are not kept from rotating. Therefore, the crankshaft 21 of the engine 10 can freely rotate without being bound by the vehicle speed (the rotational speed of the countershaft 70). In this state, the control device 100 operates the engine 10, operates the first MG 20 as a generator, and operates the second MG 30 as a motor. Thus, the motive power of the engine 10 is transmitted to the first MG 20, and is temporarily converted into an electric power. The second MG 30 is driven by the electric power.

Figure 7:
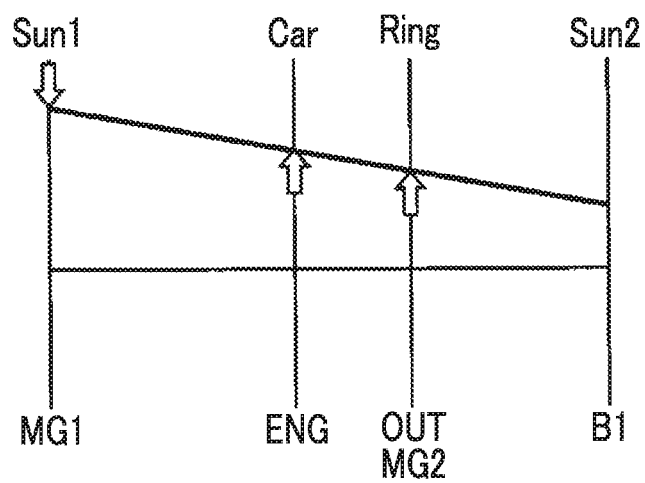
FIG. 7 is an alignment chart during a series parallel running mode in the first embodiment of the disclosure.

FIG. 7 is an alignment chart during the series/parallel mode. During the series/parallel mode, the second clutch C2 is engaged, and the first clutch C1 and the first brake B1 are released. Due to engagement of the second clutch C2, the crankshaft 21 of the engine 10 is coupled to the carrier CA. In this state, the control device 100 operates the engine 10, and operates the second MG 30 as a motor. In this case, while the torque of the first MG 20 serves as a reaction force, the torque of the engine 10 is transmitted to the ring gear R (the countershaft 70). Thus, in the series/parallel mode, part of the motive power of the engine 10 is transmitted to the first MG 20, and is converted into an electric power. The remaining motive power is mechanically transmitted to the countershaft 70 through the use of the torque of the first MG 20.

FIGS. 8 to 11 are alignment charts during the parallel mode. During the parallel mode, one of shift speeds, namely, first to fourth shift speeds that are different in a deceleration ratio γ (a ratio of the rotational speed of the engine 10 to the rotational speed of the countershaft 70) from one another is formed, in accordance with a combination of control states of the first clutch C1, the second clutch C2, and the first brake B1.

Figure 8:
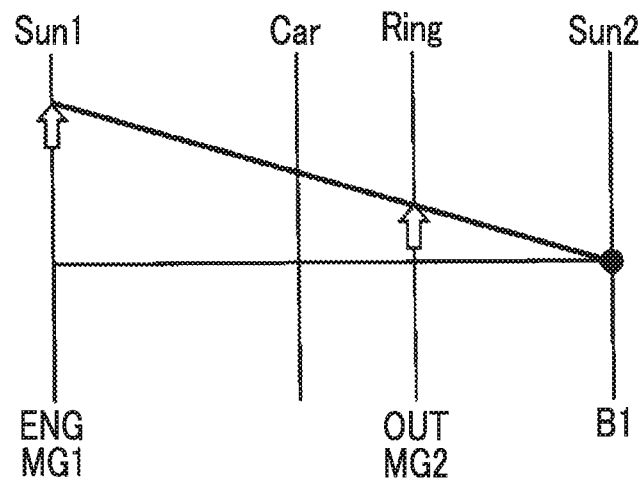
FIG. 8 is an alignment chart during a parallel running mode in the case where a first shift speed is formed in the first embodiment of the disclosure.

FIG. 8 is an alignment chart during the parallel mode in the case where the first shift speed is formed. When the first shift speed is fainted, the first clutch C1 and the first brake B1 are engaged, and the second clutch C2 is released. Due to engagement of the first clutch C1, the crankshaft 21 of the engine 10 is coupled to the first sun gear S1. Besides, due to engagement of the first brake B1, the second sun gear S2 is fixed to the case 25. Therefore, the engine 10 drives the first sun gear S1 with the second sun gear S2 serving as a fulcrum, so the torque of the engine 10 is transmitted to the ring gear R.

Figure 9:
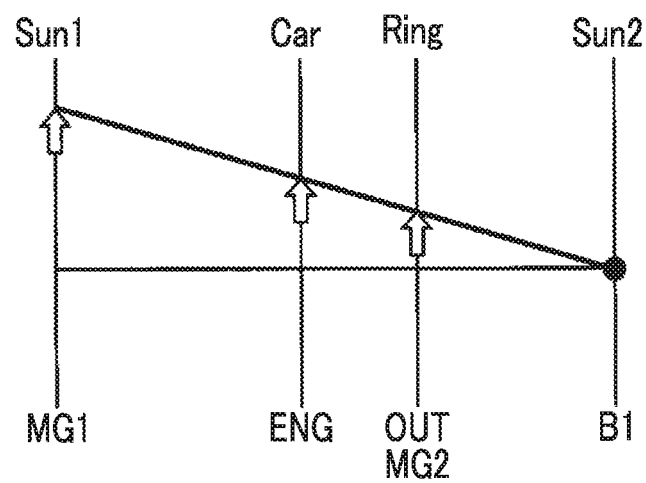
FIG. 9 is an alignment chart during the parallel running mode in the case where a second shift speed is formed in the first embodiment of the disclosure.

FIG. 9 is an alignment chart during the parallel mode in the case where the second shift speed is formed. When the second shift speed is formed, the second clutch C2 and the first brake B1 are engaged, and the first clutch C1 is released. Due to engagement of the second clutch C2, the crankshaft 21 of the engine 10 is coupled to the carrier CA. Besides, due to engagement of the first brake B1, the second sun gear S2 is fixed to the case 25. Therefore, the engine 10 drives the carrier CA with the second sun gear S2 serving as a fulcrum, so the torque of the engine 10 is transmitted to the ring gear R.

Incidentally, the deceleration ratio between the rotational speed of the engine 10 and the rotational speed of the ring gear R is smaller in the state shown in FIG. 9 than in the state shown in FIG. 8. That is, the second shift speed is a shift speed that is higher in speed than the first shift speed.

Figure 10:
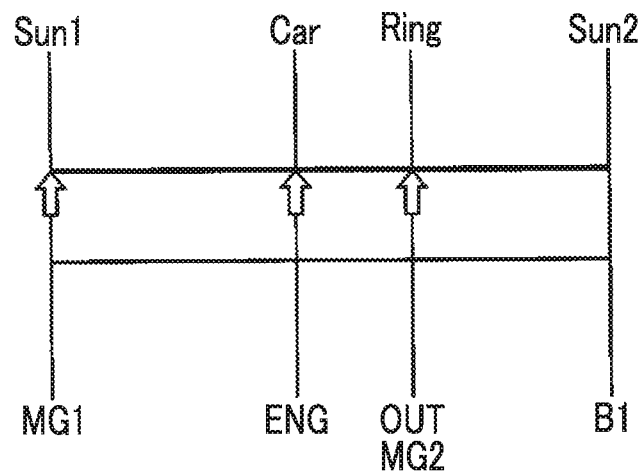
FIG. 10 is an alignment chart during the parallel running mode in the case where a third shift speed is formed in the first embodiment of the disclosure.

FIG. 10 is an alignment chart during the parallel mode in the case where the third shift speed is formed. When the third shift speed is formed, the first clutch C1 and the second clutch C2 are engaged, and the first brake B1 is released. Due to engagement of the first clutch C1 and the second clutch C2, the crankshaft 21 of the engine 10 is coupled to each of the first sun gear S1 and the carrier CA. Besides, due to release of the first brake B1, the second sun gear S2 is not kept from rotating. Therefore, the first sun gear S1, the carrier CA, the ring gear R2, and the second sun gear S2 rotate all at the same rotational speed.

Incidentally, the deceleration ratio between the rotational speed of the engine 10 and the rotational speed of the ring gear R is equal to 1 in the state shown in FIG. 10. Therefore, the deceleration ratio between the rotational speed of the engine 10 and the rotational speed of the ring gear R is smaller in the state shown in FIG. 10 than in the state shown in FIG. 9. That is, the third shift speed is a shift speed that is higher in speed than the second shift speed.

Figure 11:
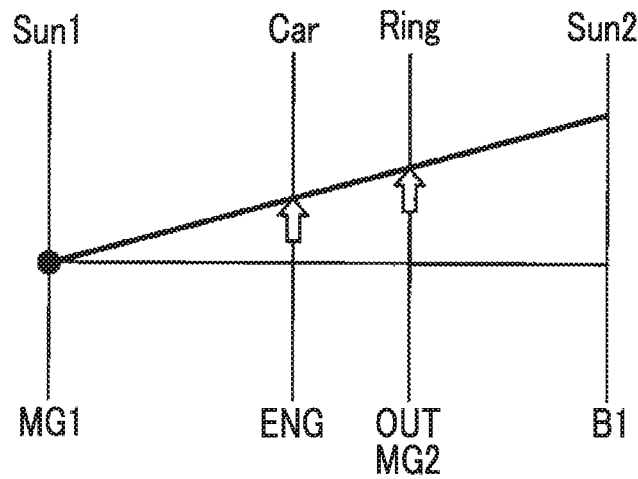
FIG. 11 is an alignment chart during the parallel running mode in the case where a fourth shift speed is formed in the first embodiment of the disclosure.

FIG. 11 is an alignment chart during the parallel mode in the case where the fourth shift speed is formed. When the fourth shift speed is formed, the second clutch C2 is engaged, and the first clutch C1 and the first brake B1 are released. Furthermore, when the fourth shift speed is formed, the current of the first MG 20 is controlled through feedback such that the rotational speed of the first MG 20 is fixed to zero (this control will be referred to hereinafter also as "electric lock"). Due to engagement of the second clutch C2, the crankshaft 21 of the engine 10 is coupled to the carrier CA. Due to electric lock, the first sun gear S1 is restrained from rotating. Therefore, the engine 10 drives the carrier CA with the first sun gear S1 serving as a fulcrum, so the torque of the engine 10 is transmitted to the ring gear R.

Incidentally, the deceleration ratio between the rotational speed of the engine 10 and the rotational speed of the ring gear R is smaller than 1 in the state shown in FIG. 11. That is, the fourth shift speed is a shift speed that is higher in speed than the third shift speed.

As described using FIGS. 8 to 11, in the parallel mode, one of the shift speeds, namely, the first to fourth shift speeds is formed, so the deceleration ratio γ is mechanically fixed to a predetermined value corresponding to each of the shift speeds. In this state, the control device 100 operates the engine 10. Therefore, the motive power of the engine 10 can be mechanically efficiently transmitted to the countershaft 70. Besides, the control device 100 operates at least one of the first MG 20 and the second MG 30 as a motor by the electric power of the battery for driving, if necessary, at each of the shift speeds. Thus, the motive power of the first MG 20 and the motive power of the second MG 30 as well as the motive power of the engine 10 can be mechanically transmitted to the countershaft 70.

As described above, the drive device 2 according to the present embodiment of the disclosure can realize the plurality of the running modes as described using FIGS. 4 to 11, by controlling the rotation states of the first sun gear, the second sun gear, the carrier, and the ring gear through the use of the first clutch C1, the second clutch C2, and the first brake B1, while making the number of parts smaller than that of a drive device employing a plurality of sets of planetary gear units.

Figure 12:
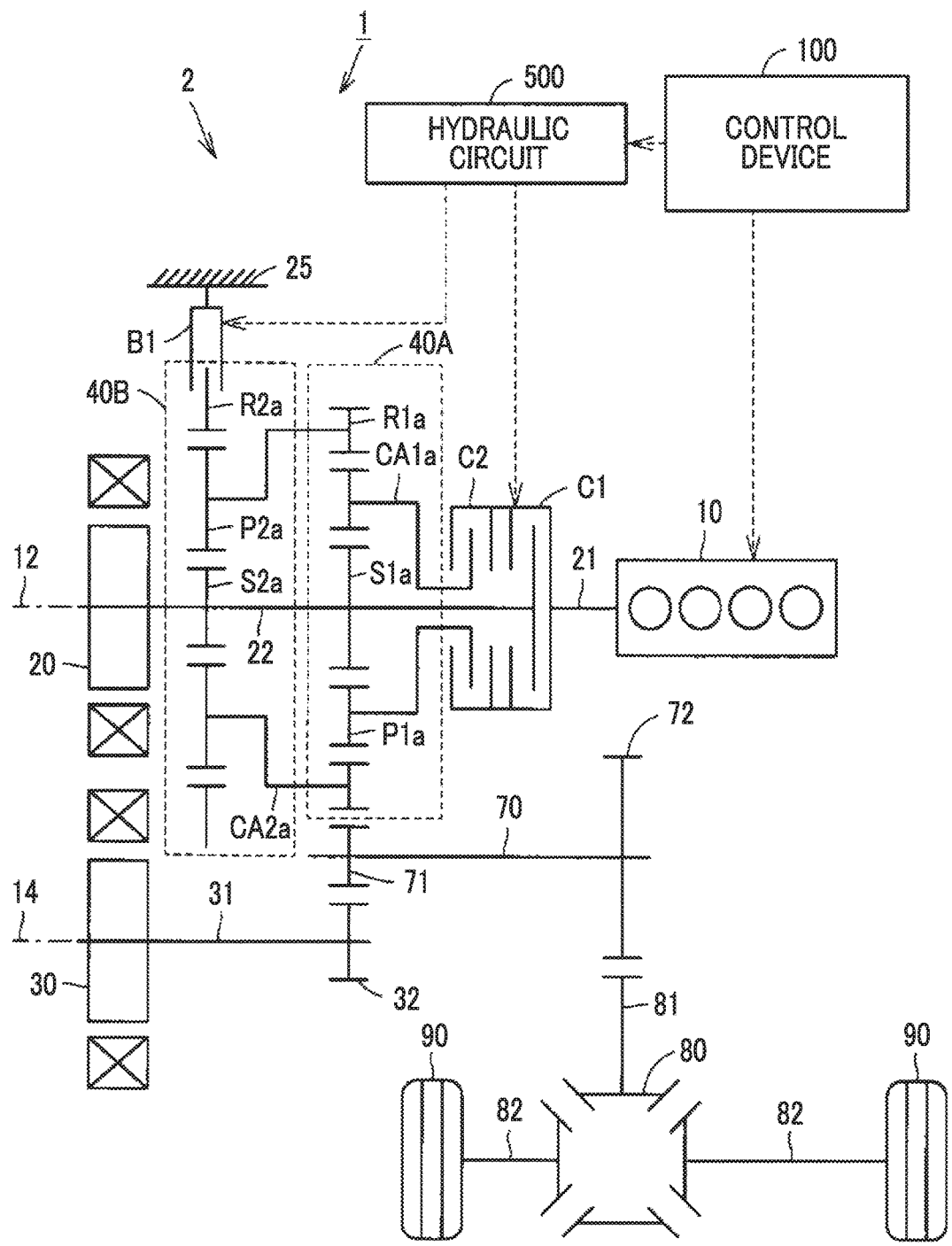
FIG. 12 is a view schematically showing an example of the general configuration of a vehicle according to a comparative example (the related art)

For example, a comparison is made with a vehicle that has a drive device employing two sets of planetary gear units as shown FIG. 12. FIG. 12 is a view showing the configuration of a vehicle 1a that is equipped with a drive device 2a according to a comparative example (the related art).

The drive device 2a is different from the drive device 2 in including a first planetary gear unit 40A and a second planetary gear unit 40B instead of the planetary gear unit 40. The vehicle 1 and the vehicle 1a are identical or substantially identical in other configurational details to each other except in respects that will be described below, and the components of the vehicle 1 and the vehicle 1a are denoted by the same reference symbols respectively, so the detailed description thereof will not be repeated.

The first planetary gear unit 40A includes a first sun gear S1a that is fixed to the rotary shaft 22, a plurality of pinions P1a, a carrier CA1a that connects the pinions P1a to one another, and a ring gear R1a that is arranged on outer peripheral sides of the respective pinions P1a and that meshes with the respective pinions P1a.

The second planetary gear unit 40B includes a second sun gear S2a that is fixed to the rotary shaft 22, a plurality of pinions P2a, a carrier CA2a that connects the pinions P2a to one another, and a ring gear R2a that is arranged on outer peripheral sides of the respective pinions P2a and that meshes with the respective pinions P2a. Both the first planetary gear unit 40A and the second planetary gear unit 40B are simple planetary gears.

The carrier CA2a is connected to the ring gear R1a. The ring gear R1a and the carrier CA2a rotate integrally with each other. In the comparative example, the first brake B1 is provided in such a manner as to be able to keep the ring gear R2a from rotating.

In contrast with the drive device 2, the drive device 2a according to the comparative example has two sets of pinions, ring gears, and carriers. That is, the configuration of the drive device 2 can make the number of parts smaller than the configuration of the drive device 2a. Therefore, the increase in manufacturing cost, the enlargement of the size of the planetary gear unit, the increase in weight, and the increase in dragging loss can be suppressed.

Besides, there is no need to provide a plurality of sets of pinions, so the attainment of a high rotation state by the pinions is easy to avoid in setting the range of the speed ratio. Therefore, the degree of freedom in setting the range of the speed ratio can be enhanced.

Figure 13:
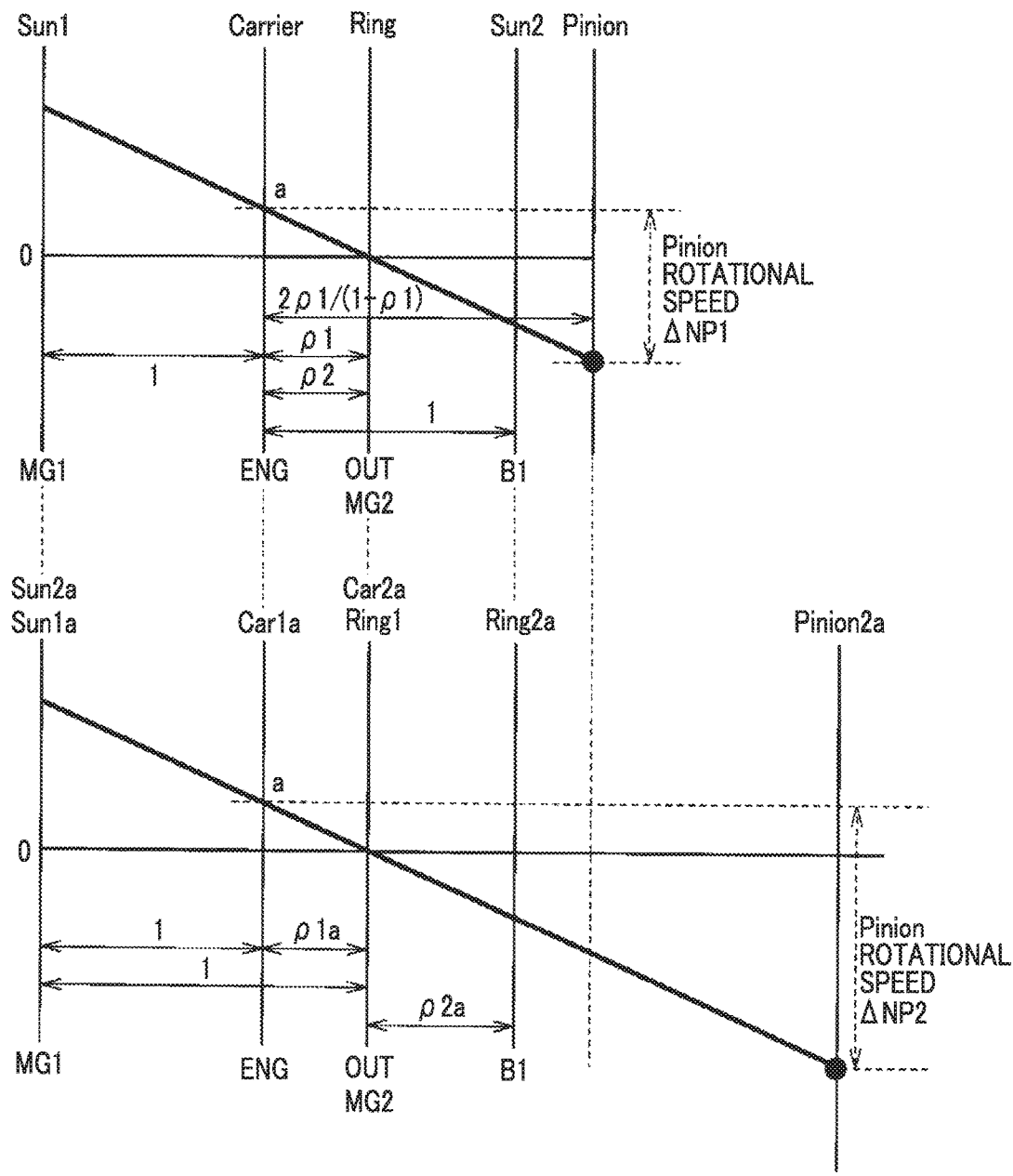
FIG. 13 is a view for illustrating a result of comparison with the vehicle according to the comparative example (the related art)

FIG. 13 is a view for illustrating a result of comparison with the vehicle 1a according to the comparative example. In an alignment chart shown in FIG. 13, "Pinion", "Sun1a", "Sun2a", "Car1a", "Car2a", "Ring1a", "Ring2a", and "Pinion2a" denote the pinions P, the first sun gear S1a, the second sun gear S2a, the carrier CA1a, the carrier CA2a, the ring gear R1a, the ring gear R2a, and the pinions P2a respectively.

As shown in FIG. 13, in the drive device 2 of the vehicle 1, a gear ratio $\rho 1$ between the first sun gear S1 and the ring gear R is expressed as NS1 (the number of teeth of the first sun gear S1)/NR (the number of teeth of the ring gear R). By the same token, a gear ratio $\rho 2$ between the second sun gear S2 and the ring gear R is expressed as NS2 (the number of teeth of the second sun gear S2)/NR (the number of teeth of the ring gear R).

On the other hand, in the drive device 2a of the vehicle 1a, a gear ratio $\rho 1a$ between the first sun gear S1 and the ring gear R1 is expressed as NS1a (the number of teeth of the first sun gear S1a)/NR1a (the number of teeth of the ring gear R1a). By the same token, a gear ratio $\rho 2a$ between the second sun gear S2a and the ring gear R2a is expressed as NS2a (the number of teeth of the second sun gear S2a)/NR2a (the number of teeth of the ring gear R2a).

It should be noted herein that there is assumed a case where the gear ratio $\rho 2a$ of the drive device 2a is set such that the rotational speed of the second sun gear S2 at the time when the gear ratio $\rho 1$ and the gear ratio $\rho 1a$ are made to coincide with each other and each of the second sun gear S2, the carrier CA, and the ring gear R in the drive device 2 is rendered in a predetermined rotation state becomes equal to the rotational speed of the ring gear R2a at the time when each of the first sun gear S1a (the second sun gear S2a), the carrier CA1a, and the ring gear R1a (the carrier CA2a) in the drive device 2a according to the comparative example is rendered in the predetermined rotation state in the same manner.

Furthermore, as the predetermined rotation state, a case where an operating condition under which the rotational speed of the pinions P is high is fulfilled (e.g., a case where the vehicle 1 is started with the rotational speed of the engine 10 made equal to a predetermined rotational speed a (the rotational speed of the ring gear R is equal to zero) in the series/parallel mode), and a case where an operating condition under which the rotational speed of the pinions P2a is high is fulfilled (e.g., a case where the vehicle 1a is started with the rotational speed of the engine 10 made equal to the predetermined rotational speed a (the rotational speed of the ring gear R1a is equal to zero) in the series/parallel mode) are assumed.

In this case, as shown in FIG. 13, when the aforementioned operating conditions are fulfilled, the gradient of an alignment line in an upper graph and the gradient of an alignment line in a lower graph are equal to each other. Furthermore, by making the gear ratio $\rho 1$ and the gear ratio $\rho 1a$ coincide with each other, there is established a positional relationship in which an axis of ordinate representing the rotational speed of the first sun gear S1, an axis of ordinate representing the rotational speed of the carrier CA, and an axis of ordinate representing the rotational speed of the ring gear R in the upper graph are aligned with an axis of ordinate representing the rotational speed of the first sun gear S1a (the second sun gear S2a), an axis of ordinate representing the rotational speed of the carrier CA1a, and an axis of ordinate representing the rotational speed of the ring gear R1a (the carrier CA2a) in the lower graph respectively.

Furthermore, by setting the gear ratio $\rho 2a$ of the drive device 2a such that the rotational speed of the second sun gear S2 at the time when the drive device 2 is rendered in the predetermined rotation state becomes equal to the rotational speed of the ring gear R2a at the time when the drive device 2a is rendered in the predetermined rotation state, there is established a positional relationship in which the axis of ordinate representing the rotational speed of the second sun gear S2 in the upper graph is aligned with the axis of ordinate representing the rotational speed of the ring gear R2a in the lower graph.

In this case, there is established a positional relationship in which the axis of ordinate representing the rotational speed of the pinions P in the alignment chart of the drive device 2 is located to the left of the axis of ordinate representing the rotational speed of the pinions P2 in the alignment chart of the drive device 2a.

Therefore, a rotational speed difference ΔNP1 between the rotational speed of the pinions P and the rotational speed of the engine 10 at the time when the drive device 2 is in the predetermined rotation state is smaller than a rotational speed difference ΔNP2 between the rotational speed of the pinions P2 and the rotational speed of the engine 10 at the time when the drive device 2a is in the predetermined rotation state.

That is, when the drive device 2 and the drive device 2a are operated in the predetermined rotation state, the drive device 2 can limit the rotational speed of the pinions P to a rotational speed lower than that of the pinions P2. For example, if there is assumed a case where the upper limit of the rotational speed of the pinions P and the upper limit of the rotational speed of the pinions P2 are equal to each other, ρ2 can be adjusted within a range to the upper limit of the rotational speed of the pinions P2. Therefore, it is also possible to raise the maximum vehicle speed in EV running by setting the shift speed to a higher gear, or to set the speed ratios of the first to fourth shift speeds at appropriate intervals. In this manner, the degree of freedom in setting the range of the speed ratio can be enhanced.

The drive device 2 according to the second embodiment of the disclosure will be described using FIGS. 14 to 16. Incidentally, as for the configuration shown in FIGS. 14 to 16, components that are identical or substantially identical to those shown in FIGS. 1 to 11 are denoted by the same reference symbols respectively, so the detailed description thereof will not be repeated.

Figure 14:
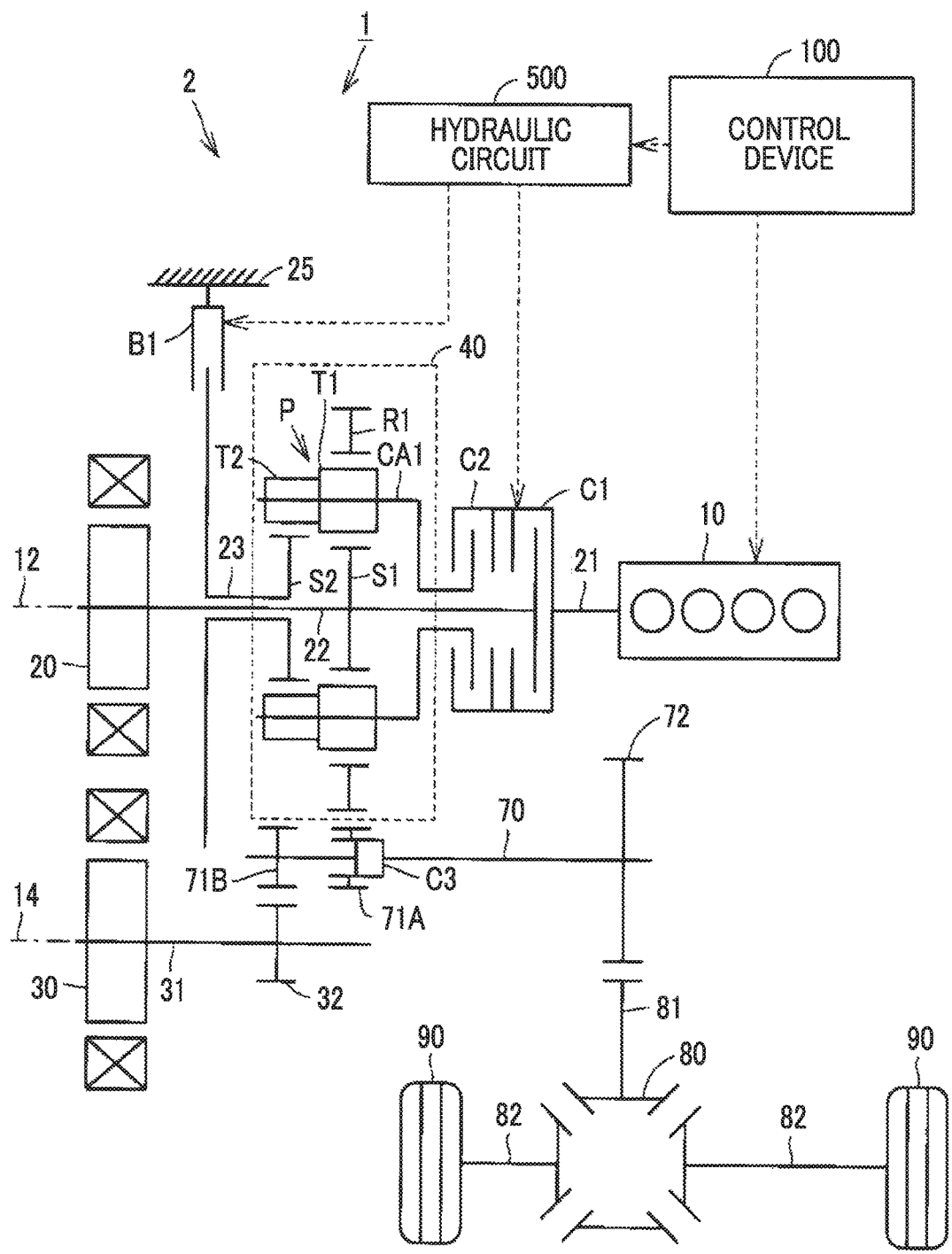
FIG. 14 is a view schematically showing an example of the general configuration of a vehicle in the second embodiment of the disclosure.

FIG. 14 is a view schematically showing an example of the general configuration of the vehicle 1 in the second embodiment of the disclosure. As shown in FIG. 14, the vehicle 1 in the second embodiment of the disclosure is obtained by providing the countershaft 70 with driven gears 71A and 71B instead of providing the countershaft 70 with the driven gear 71 in the vehicle 1 shown in FIG. 1, and adding a third clutch C3 thereto.

The driven gear 71A is fixed to one end side of the countershaft 70. The driven gear 71A meshes with outer peripheral teeth that are formed on the outer peripheral surface of the ring gear R.

The driven gear 71A is provided with the third clutch C3. The third clutch C3 can make a changeover between a state in which the driven gear 71A and the countershaft 70 are connected to each other and a state in which the driven gear 71A and the countershaft 70 are not connected to each other. When the third clutch C3 is released, the torque from the ring gear R is not transmitted to the countershaft 70. For example, a dog clutch can be adopted as the third clutch C3.

The reduction gear 32 that is fixed to the rotary shaft 31 of the second MG 30 meshes with the driven gear 71B. The driven gear 71B is fixed at a position offset from the driven gear 71A of the countershaft 70 in an axial direction (a leftward direction on the sheet of FIG. 14). Therefore, the motive power from the second MG 30 is transmitted to the countershaft 70 through the reduction gear 32 and the driven gear 71B.

Next, running modes of the vehicle 1 that is mounted with the drive device 2 configured as described above will be described. The running modes that can be selected in the vehicle 1 in the second embodiment of the disclosure are the same as the running modes that can be selected in the vehicle 1 in the above-mentioned first embodiment of the disclosure. Therefore, the detailed description of the respective running modes will not be repeated.

Figures 15, 16:
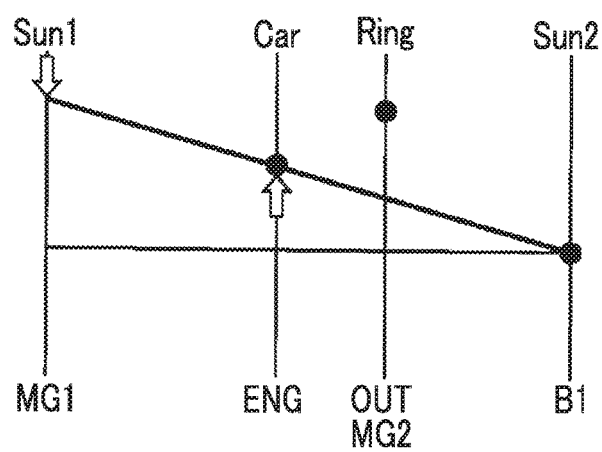
FIG. 15 is an engagement chart showing control states of clutches and a brake corresponding to respective running modes in the second embodiment of the disclosure.
FIG. 16 is an alignment chart during a series running mode in the second embodiment of the disclosure.

FIG. 15 is an engagement chart showing control states of the first clutch C1, the second clutch C2, the third clutch C3, and the first brake B1 in each of the running modes in the second embodiment of the disclosure. The engagement chart shown in FIG. 15 is different from the engagement chart shown in FIG. 3 in that an engagement state of the third clutch C3 is shown, and that the first clutch C1 is released and the second clutch C2 and the first brake B1 are engaged in the series mode. However, the engagement chart shown in FIG. 15 is identical to the engagement chart shown in FIG. 3 in the other respects. Therefore, the detailed description of the engagement chart will not be repeated except what will be described below.

As shown in FIG. 15, the third clutch C3 is controlled to be engaged in any one of the running modes other than the series mode. Therefore, the control states of the first clutch C1, the second clutch C2, and the first brake B1 in the running modes other than the series mode are the same as the control states of the first clutch C1, the second clutch C2, and the first brake B1 in the running modes other than the series mode described using FIGS. 3 to 11, respectively. Therefore, the detailed description of the control states of the first clutch C1, the second clutch C2, and the first brake B1 in each of the running modes will not be repeated. On the other hand, when the series mode is selected, the first clutch C1 and the third clutch C3 are released, and the second clutch C2 and the first brake B1 are engaged.

FIG. 16 is an alignment chart during the series mode in the second embodiment of the disclosure. As described above, during the series mode, the first clutch C1 and the third clutch C3 are released, and the second clutch C2 and the first brake B1 are engaged.

Due to engagement of the first brake B1, the second sun gear S2 is fixed. Due to engagement of the second clutch C2, the crankshaft 21 of the engine 10 is coupled to the carrier CA. Therefore, the torque from the engine 10 is transmitted to the carrier CA. The torque transmitted to the carrier CA is transmitted to the first sun gear S1, and is transmitted to the first MG 20. Besides, due to release of the third clutch C3, the torque of the engine 10 is not transmitted to the countershaft 70 from the ring gear R. Therefore, the crankshaft 21 of the engine 10 can freely rotate without being bound by the vehicle speed. In this state, the control device 100 operates the engine 10, operates the first MG 20 as a generator, and operates the second MG 30 as a motor. Thus, the motive power of the engine 10 is transmitted to the first MG 20, and is temporarily converted into an electric power. The second MG 30 is driven by the electric power.

It should be noted herein that the rotational speed of the first sun gear S1 is higher than the rotational speed of the carrier CA, and the second sun gear S2 takes charge of part of the torque that is transmitted to the first sun gear S1, as shown in FIG. 16. Therefore, the torque that is transmitted to the first sun gear S1 is smaller than the torque that is output from the engine 10. Therefore, the torque that is received by the first MG 20 can be held small, so the size of the motor of the first MG 20 can be held small.

As described hitherto, the configuration of the drive device 2 according to the second embodiment of the disclosure makes it possible to hold the size of the first MG 20 small, in addition to the operation and effect according to the configuration of the drive device 2 as described in the above-mentioned first embodiment of the disclosure. Therefore, the cost of the first MG 20 can be reduced, and the mountability of the first MG 20 can be enhanced. Furthermore, the weight of the first MG 20 can be reduced as the size of the first MG 20 is reduced.

The drive device 2 in the third embodiment of the disclosure will be described using FIGS. 17 to 19. Incidentally, as for the configuration shown in FIGS. 17 to 19, components that are identical or substantially identical to those shown in FIG. 14 are denoted by the same reference symbols respectively, so the detailed description thereof will not be repeated.

Figure 17:
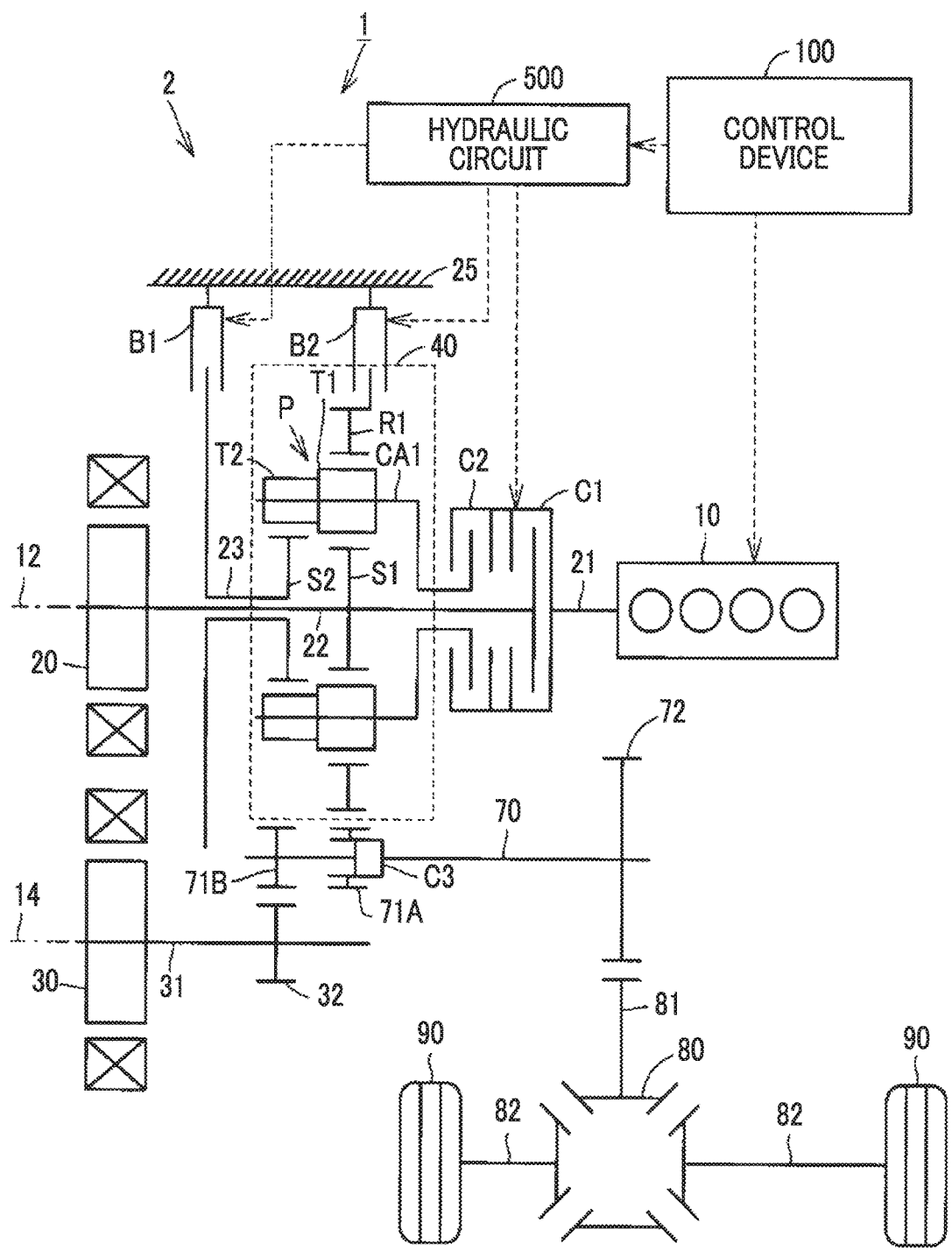
FIG. 17 is a view schematically showing an example of the general configuration of a vehicle according to the third embodiment of the disclosure.

FIG. 17 is a view schematically showing an example of the general configuration of the vehicle 1 in the third embodiment of the disclosure. As shown in FIG. 17, the vehicle 1 in the third embodiment of the disclosure is obtained by adding a second brake B2 to the vehicle 1 shown in FIG. 14.

The second brake B2 is provided on an outer peripheral side of the ring gear R and on the case 25. The second brake B2 is a frictional engagement element that can keep the ring gear R from rotating. When the second brake B2 is engaged, the ring gear R is fixed to the case 25, and is kept from rotating. When the second brake B2 is released, the ring gear R is allowed to rotate.

Next, running modes of the vehicle 1 that is mounted with the drive device 2 configured as described above will be described. The running modes that can be selected in the vehicle 1 in the third embodiment of the disclosure are the same as the running modes that can be selected in the vehicle 1 in the above-mentioned first embodiment of the disclosure. Therefore, the detailed description of the respective running modes will not be repeated.

Figures 18, 19:
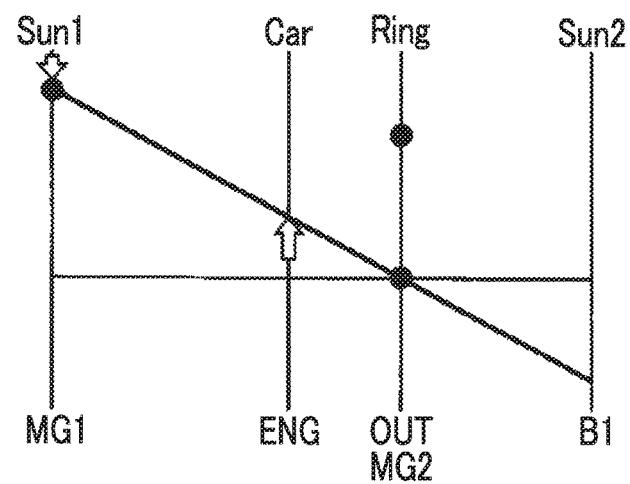
FIG. 18 is an engagement chart showing control states of clutches and brakes corresponding to respective running modes in the third embodiment of the disclosure.
FIG. 19 is an alignment chart during a series running mode in the third embodiment of the disclosure.

FIG. 18 is an engagement chart showing control states of the first clutch C1, the second clutch C2, the third clutch C3, the first brake B1, and the second brake B2 in each of the running modes in the third embodiment of the disclosure. The engagement chart shown in FIG. 18 is different from the engagement chart shown in FIG. 15 in that an engagement state of the second brake B2 is shown, and that the first brake B1 is released and the second brake B2 is engaged in the series mode. However, the engagement chart shown in FIG. 18 is identical to the engagement chart shown in FIG. 15 in the other respects. Therefore, the detailed description of the engagement chart will not be repeated except what will be described below.

As shown in FIG. 18, the third clutch C3 is controlled to be engaged in any one of the running modes other than the series mode. Furthermore, the second brake B2 is controlled to be released in any one of the running modes other than the series mode.

Therefore, the control states of the first clutch C1, the second clutch C2, and the first brake B1 in the running modes other than the series mode are the same as the control states of the first clutch C1, the second clutch C2, and the first brake B1 in the running modes other than the series mode described using FIGS. 3 to 11, respectively. Therefore, the detailed description of the control states of the first clutch C1, the second clutch C2, and the first brake B1 in each of the running modes will not be repeated. On the other hand, when the series mode is selected, the first clutch C1, the third clutch C3, and the first brake B1 are released, and the second clutch C2 and the second brake B2 are engaged.

FIG. 19 is an alignment chart during the series mode in the third embodiment of the disclosure. As described above, during the series mode, the first clutch C1, the third clutch C3, and the first brake B1 are released, and the second clutch C2 and the second brake B2 are engaged.

Due to engagement of the third brake B3, the ring gear R is fixed. Due to engagement of the second clutch C2, the crankshaft 21 of the engine 10 is coupled to the carrier CA. Therefore, the torque from the engine 10 is transmitted to the carrier CA. The torque transmitted to the carrier CA is transmitted to the first sun gear S1, and is transmitted to the first MG 20. Besides, due to release of the third clutch C3, even when the ring gear R is fixed, the countershaft 70 is not kept from rotating by the ring gear R. As a result, the crankshaft 21 of the engine 10 can freely rotate without being bound by the vehicle speed.

It should be noted herein that the rotational speed of the first sun gear S1 is higher than the rotational speed of the carrier CA, and the ring gear R takes charge of part of the torque that is transmitted to the first sun gear S1, as shown in FIG. 19. Therefore, the torque that is transmitted to the first sun gear S1 is smaller than the torque that is output from the engine 10. Therefore, the torque that is received by the first MG 20 can be held small, so the size of the motor of the first MG 20 can be held small. In particular, a comparison with the case shown in FIG. 16 reveals that the magnitude of the torque that is taken charge of by the ring gear R in FIG. 19 is larger than the magnitude of the torque that is taken charge of by the second sun gear S2 in FIG. 16, so the torque that is received by the first MG 20 can be held smaller. Therefore, the size of the first MG 20 can be further reduced.

As described hitherto, the configuration of the drive device 2 according to the third embodiment of the disclosure makes it possible to hold the size of the first MG 20 small, in addition to the operation and effect according to the configuration of the drive device 2 as described in the above-mentioned first embodiment of the disclosure. Therefore, the cost of the first MG 20 can be reduced, and the mountability of the first MG 20 can be enhanced. Furthermore, the weight of the first MG 20 can be reduced as the size of the first MG 20 is reduced.

The drive device 2 in the fourth embodiment of the disclosure will be described using FIGS. 20 and 21. Incidentally, as for the configuration shown in FIG. 20, components that are identical or substantially identical to those shown in FIG. 1 are denoted by the same reference symbols respectively, so the detailed description thereof will not be repeated.

Figure 20:
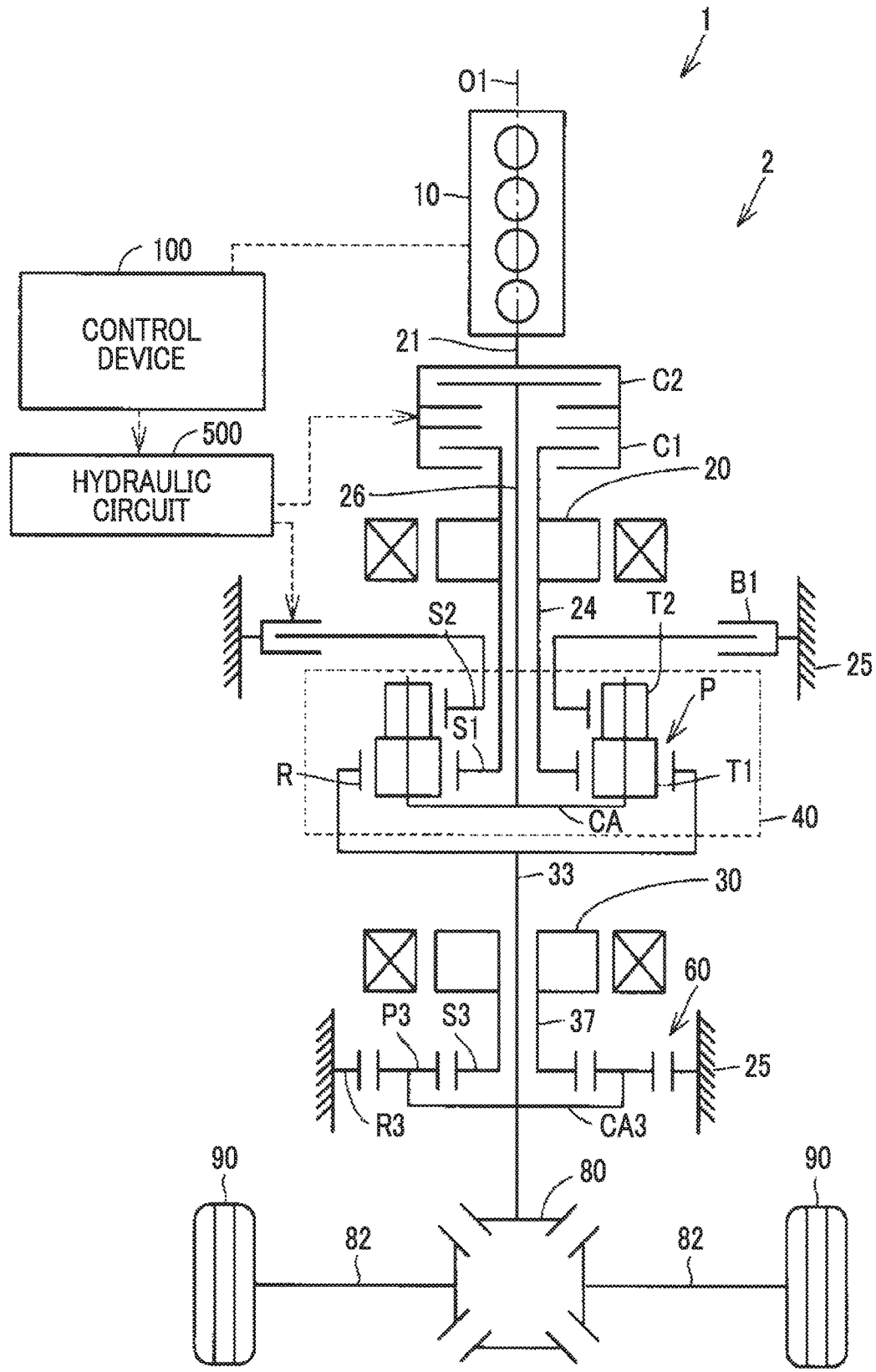
FIG. 20 is a view schematically showing an example of the general configuration of a vehicle in the fourth embodiment of the disclosure.

FIG. 20 is a view schematically showing an example of the general configuration of the vehicle 1 in the fourth embodiment of the disclosure. As shown in FIG. 20, the vehicle 1 in the fourth embodiment of the disclosure is obtained by changing the components of the drive device 2 shown in FIG. 1 such that they are arranged on the same axis in such a manner that rotation centers thereof coincide with one another, in the sequence of the engine 10, the first MG 20, and the second MG 30.

The difference between the drive device 2 shown in FIG. 20 and the drive device 2 shown in FIG. 1 described in the above-mentioned first embodiment of the disclosure will be described hereinafter. A hollow shaft 24 that is hollow is provided instead of the rotary shaft 22 of FIG. 1. The first sun gear S1 of the planetary gear unit 40 is connected to one end of the hollow shaft 24. The other end of the hollow shaft 24 is connected to the first clutch C1. The rotor of the first MG 20 is fixed between the ends of the hollow shaft 24. Therefore, the hollow shaft 24 and the rotor of the first MG 20 rotate integrally with each other. Besides, the hollow shaft 24 of FIG. 20 is arranged such that an axial direction of the hollow shaft 24 coincides with a longitudinal direction of the vehicle 1. Furthermore, the hollow shaft 24 of FIG. 20 is arranged rotatably around a rotational centerline O1.

The first clutch C1 selectively makes a changeover between a state in which the engine 10 and the other end of the hollow shaft 24 are connected to each other and a state in which the engine 10 and the other end of the hollow shaft 24 are not connected to each other. That is, the first clutch C1 selectively makes a changeover between a state in which the first sun gear S1 and the engine 10 are connected to each other via the hollow shaft 24 and a state in which the first sun gear S1 and the engine 10 are not connected to each other via the hollow shaft 24.

A connection shaft 26 is passed through the interior of the hollow shaft 24. One end of the connection shaft 26 is connected to the carrier CA. The other end of the connection shaft 26 is connected to the second clutch C2. The connection shaft 26 of FIG. 20 is arranged rotatably around the rotational centerline O1.

The second clutch C2 selectively makes a changeover between a state in which the other end of the connection shaft 26 and the engine 10 are connected to each other and a state in which the other end of the connection shaft 26 and the engine 10 are not connected to each other. That is, the second clutch C2 selectively makes a changeover between a state in which the carrier CA and the engine 10 are connected to each other via the connection shaft 26 and a state in which the carrier CA and the engine 10 are not connected to each other via the connection shaft 26.

Furthermore, in the above-mentioned drive device 2 shown in FIG. 1, the ring gear R has been described as being connected to the drive shaft 82 via the driven gear 71, the countershaft 70, the drive gear 72, the differential ring gear 81, and the differential gear set 80. However, in the drive device 2 shown in FIG. 20, the ring gear R is connected to the drive shaft 82 via a propeller shaft 33 and the differential gear set 80. The propeller shaft 33 is arranged rotatably around the rotational centerline O1. That is, the connection shaft 26 is arranged coaxially with the propeller shaft 33.

Furthermore, the above-mentioned drive device 2 shown in FIG. 1 has been described as having a decelerator that is constituted of the driven gear 71 and the reduction gear 32 that is connected to the rotary shaft 31 of the second MG 30. Instead of this decelerator, however, the drive device 2 shown in FIG. 20 has a decelerator 60 employing a planetary gear unit.

The rotor of the second MG 30 is fixed to one end of a hollow shaft 37 that is hollow, instead of being fixed to the rotary shaft 31. That is, the rotor of the second MG 30 rotates integrally with the hollow shaft 37. The other end of the hollow shaft 37 is connected to the decelerator 60. The hollow shaft 37 of FIG. 20 is arranged rotatably around the rotational centerline O1.

The decelerator 60 includes a third sun gear S3, a plurality of pinions P3, a ring gear R3, and a carrier CA3. The third sun gear S3 is connected to the other end of the hollow shaft 37. The ring gear R3 is provided on an outer peripheral side of the third sun gear S3. The ring gear R3 is fixed to the case 25. The pinions P3 are provided between the third sun gear S3 and the ring gear R3. The carrier CA3 supports the respective pinions P3 such that they can rotate around their own axes and around the rotational centerline O1. The carrier CA3 is fixed to the propeller shaft 33. Therefore, the carrier CA3 and the propeller shaft 33 rotate integrally with each other. The third sun gear S3, the ring gear R3, and the carrier CA3 are all provided rotatably around the rotational centerline O1.

This configuration establishes a relationship in which the rotational speed of the third sun gear S3, the rotational speed of the carrier CA3, and the rotational speed of the ring gear R3 are linked with one another by a straight line in an alignment chart.

Next, running modes of the vehicle 1 that is mounted with the drive device 2 configured as described above will be described. The running modes that can be selected in the vehicle 1 in the fourth embodiment of the disclosure are the same as the running modes that can be selected in the vehicle 1 in the above-mentioned first embodiment of the disclosure. Therefore, the detailed description of the respective running modes will not be repeated.

The control states of the first clutch C1, the second clutch C2, and the first brake B1 in each of the running modes are the same as the control states according to the engagement chart of FIG. 3 described in the above-mentioned first embodiment of the disclosure. Therefore, the detailed description of the control states of the first clutch C1, the second clutch C2, and the first brake B1 in each of the running modes will not be repeated, except the description of the control states of the first clutch C1, the second clutch C2, and the first brake B1 in the series mode exemplified below.

Figure 21:
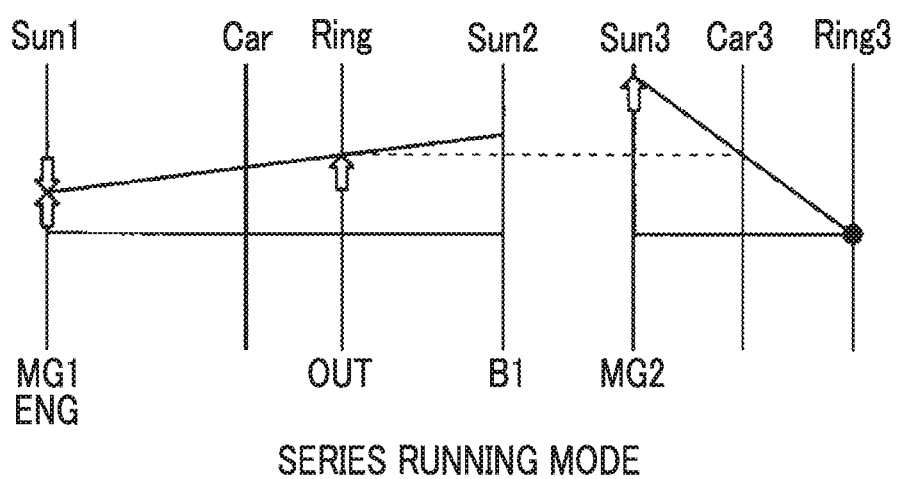
FIG. 21 is an alignment chart during a series running mode in the fourth embodiment of the disclosure.

FIG. 21 is an alignment chart during the series mode in the fourth embodiment of the disclosure. In the alignment chart shown in FIG. 21, "Sun1", "Sun2", "Sun3", "Car", "Car3", "Ring", "Ring3", "ENG", "MG1", "MG2", "B1", and "OUT" denote the first sun gear S1, the second sun gear S2, the third sun gear S3, the carrier CA, the carrier CA3, the ring gear R1, the ring gear R3, the engine 10, the first MG 20, the second MG 30, the first brake B1, and the propeller shaft 33 respectively.

During the series mode in the fourth embodiment of the disclosure, the first clutch C1 is engaged, and the second clutch C2 and the first brake B1 are released. Due to engagement of the first clutch C1, the engine 10 and the first MG 20 are coupled to each other via the hollow shaft 24. Due to release of the second clutch C2, the carrier CA becomes rotatable. Besides, due to release of the first brake B1, the second sun gear S2 becomes rotatable.

The control device 100 operates the engine 10, the first MG 20, and the second MG 30. That is, by operating the engine 10, the torque of the engine 10 is transmitted to the first MG 20 via the first clutch C1 and the hollow shaft 24, and the first MG 20 is caused to generate electric power.

The second MG 30 operates as a motor through the use of the entirety or part of the electric power generated by the first MG 20. Then, the vehicle 1 runs by a second MG torque from the second MG 30. The ring gear R3 is fixed to the case 25. Therefore, the rotational speed of the second MG 30 rises with the ring gear R3 serving as a fulcrum, so the rotational speed of the propeller shaft 33 that is connected to the carrier CA3 rises.

As described hitherto, the configuration of the drive device 2 according to the fourth embodiment of the disclosure makes it possible to arrange the engine 10, the first MG 20, the planetary gear unit 40, and the second MG 30 in this sequence, in addition to the operation and effect according to the configuration of the drive device 2 described in the above-mentioned first embodiment of the disclosure. Therefore, the drive device can be configured to suit an FR vehicle.

The drive device 2 in the fifth embodiment of the disclosure will be described using FIG. 22. Incidentally, as for the configuration shown in FIG. 22, components that are identical or substantially identical to those shown in FIG. 20 are denoted by the same reference symbols respectively, so the detailed description thereof will not be repeated.

Figure 22:
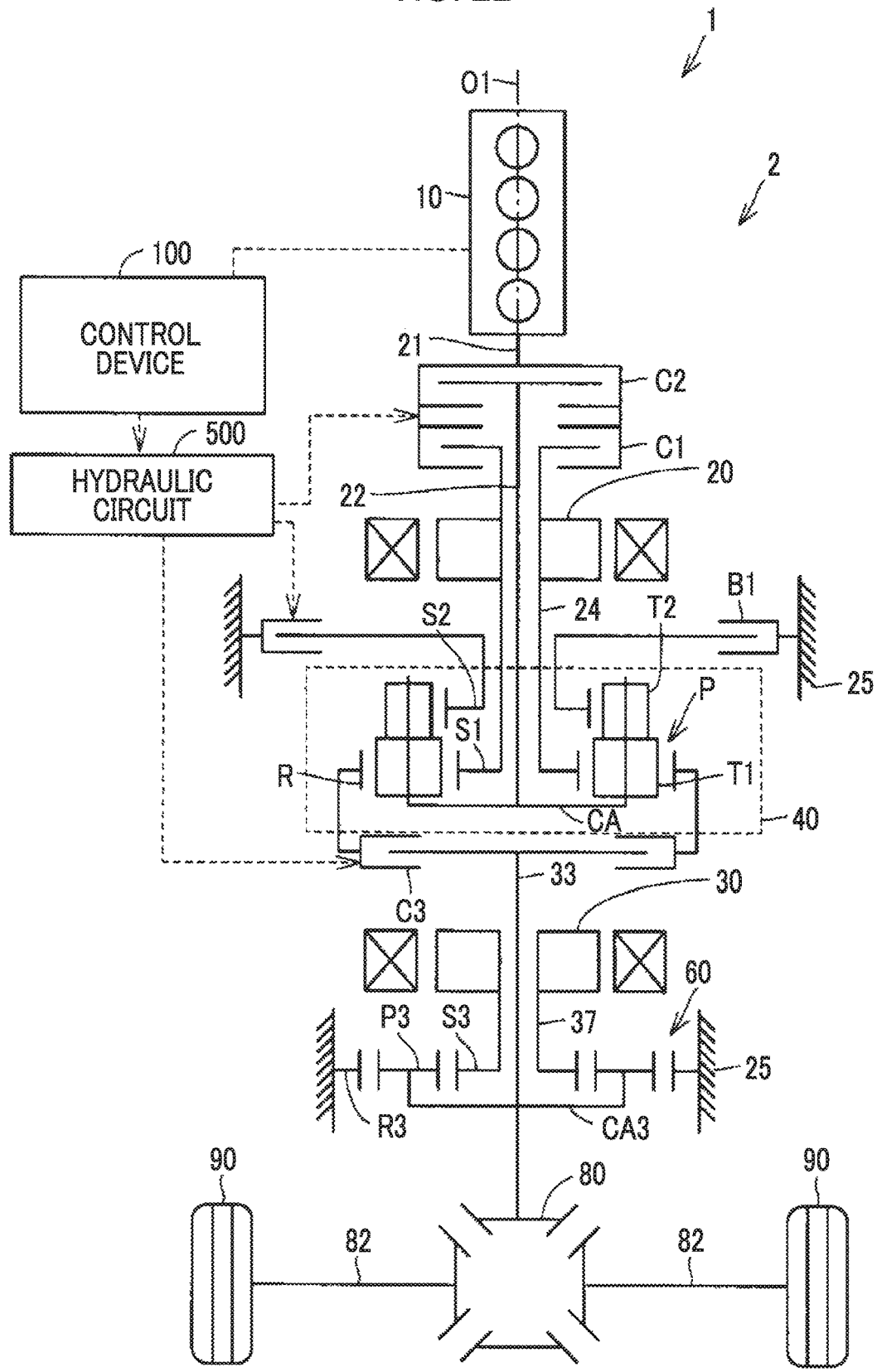
FIG. 22 is a view schematically showing an example of the general configuration of a vehicle in the fifth embodiment of the disclosure.

FIG. 22 is a view schematically showing an example of the general configuration of the vehicle 1 in the fifth embodiment of the disclosure. As shown in FIG. 22, the vehicle 1 in the fifth embodiment of the disclosure is obtained by adding the third clutch C3 between the ring gear R and the propeller shaft 33 in the vehicle 1 shown in FIG. 20.

The third clutch C3 is a hydraulic frictional engagement element that can couple the ring gear R and the propeller shaft 33 to each other. The third clutch C3 can make a changeover between a state in which the ring gear R and the propeller shaft 33 are connected to each other and a state in which the ring gear R and the propeller shaft 33 are not connected to each other. When the third clutch C3 is released, the torque from the ring gear R is not transmitted to the propeller shaft 33.

Next, running modes of the vehicle 1 that is mounted with the drive device 2 configured as described above will be described. The running modes that can be selected in the vehicle 1 in the fifth embodiment of the disclosure are the same as the running modes that can be selected in the vehicle 1 in the above-mentioned first embodiment of the disclosure. Therefore, the detailed description of the respective running modes will not be repeated.

The control states of the first clutch C1, the second clutch C2, the third clutch C3, and the first brake B1 in each of the running modes in the fifth embodiment of the disclosure are the same as the control states of the first clutch C1, the second clutch C2, the third clutch C3, and the first brake B1 in each of the running modes in the second embodiment of the disclosure, respectively. Therefore, the control states of the first clutch C1, the second clutch C2, the third clutch C3, and the first brake B1 in each of the running modes are the control states according to the engagement chart of FIG. 15 described in the above-mentioned second embodiment of the disclosure, respectively. Therefore, the detailed description of the control states of the first clutch C1, the second clutch C2, the third clutch C3, and the first brake B1 in each of the running modes will not be repeated.

As described hitherto, the configuration of the drive device 2 according to the fifth embodiment of the disclosure exerts the operation and effect according to the configuration of the drive device 2 as described in each of the above-mentioned first, second, and fourth embodiments of the disclosure.

The drive device 2 in the sixth embodiment of the disclosure will be described using FIG. 23. Incidentally, as for the configuration shown in FIG. 23, components that are identical or substantially identical to those shown in FIG. 22 are denoted by the same reference symbols respectively, so the detailed description thereof will not be repeated.

Figure 23:
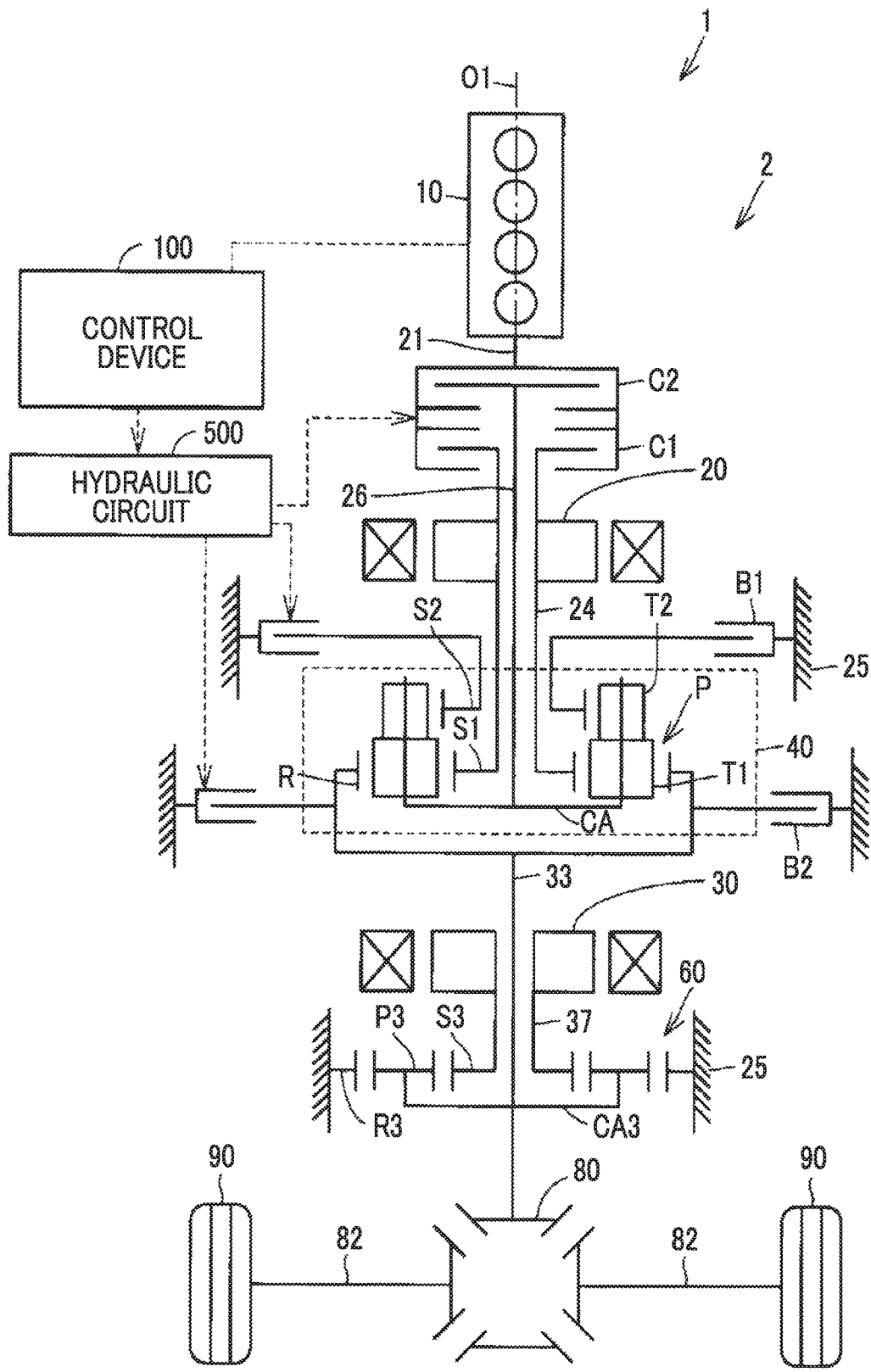
FIG. 23 is a view schematically showing an example of the general configuration of a vehicle in the sixth embodiment of the disclosure.

FIG. 23 is a view schematically showing an example of the general configuration of the vehicle 1 in the sixth embodiment of the disclosure. As shown in FIG. 23, the vehicle 1 in the sixth embodiment of the disclosure is obtained by adding the second brake B2 to the vehicle 1 shown in FIG. 22. The second brake B2 functions in the same manner as the second brake B2 described in the above-mentioned third embodiment of the disclosure, so the detailed description thereof will not be repeated.

Next, running modes of the vehicle 1 that is mounted with the drive device 2 configured as described above will be described. The running modes that can be selected in the vehicle 1 in the sixth embodiment of the disclosure are the same as the running modes that can be selected in the vehicle 1 in the above-mentioned first embodiment of the disclosure. Therefore, the detailed description of the respective running modes will not be repeated.

The control states of the first clutch C1, the second clutch C2, the third clutch C3, the first brake B1, and the second brake B2 in each of the running modes in the sixth embodiment of the disclosure are the same as the control states of the first clutch C1, the second clutch C2, the third clutch C3, the first brake B1, and the second brake B2 in each of the running modes in the third embodiment of the disclosure, respectively. Therefore, the control states of the first clutch C1, the second clutch C2, the third clutch C3, the first brake B1, and the second brake B2 in each of the running modes are the control states according to the engagement chart of FIG. 18 described in the above-mentioned third embodiment of the disclosure, respectively. Therefore, the detailed description of the control states of the first clutch C1, the second clutch C2, the third clutch C3, the first brake B1, and the second brake B2 in each of the running modes will not be repeated.

As described hitherto, the configuration of the drive device 2 according to the sixth embodiment of the disclosure exerts the operation and effect according to the configuration of the drive device 2 as described in each of the above-mentioned first, third, and fourth embodiments of the disclosure.

The embodiments of the disclosure disclosed herein should be considered to be exemplary and nonrestrictive in all respects. The scope of the present disclosure is defined not by the foregoing description but by the claims. The present disclosure is intended to encompass all the alterations that are equivalent in significance and scope to the claims.

What is claimed is:

1. A drive device for a hybrid vehicle, the drive device comprising:
   a drive shaft that is connected to a driving wheel of the hybrid vehicle;
   an engine;
   a first rotating electrical machine;
   a second rotating electrical machine that is mechanically connected to the drive shaft;
   a planetary gear unit as a Ravigneaux-type planetary gear unit, the planetary gear unit including a first sun gear that is connected to the first rotating electrical machine, a second sun gear that is arranged such that a rotation center of the second sun gear coincides with a rotation center of the first sun gear, a ring gear that is mechanically connected to the drive shaft, and a pinion that includes a first tooth portion and a second tooth portion, and a carrier that is connected to the pinion, the first tooth portion meshing with the ring gear and the first sun gear, and the second tooth portion being provided at a position offset from the first tooth portion in an axial direction of the pinion and meshing with the second sun gear;
   a first clutch that is configured to selectively make a changeover between a state in which the first sun gear and the engine are connected to each other and a state in which the first sun gear and the engine are not connected to each other;

a second clutch that is configured to selectively make a changeover between a state in which the carrier and the engine are connected to each other and a state in which the carrier and the engine are not connected to each other; and a first brake that is configured to selectively make a changeover between a state in which the second sun gear is fixed to a fixation member and a state in which the second sun gear is not fixed to the fixation member.

2. The drive device according to claim 1, further comprising:
a driven gear that meshes with the ring gear, is the driven gear being mechanically connected to the drive shaft.

3. The drive device according to claim 2, wherein
the second rotating electrical machine is mechanically connected to the driven gear.

4. The drive device according to claim 2, further comprising:
a third clutch that is configured to selectively make a changeover between a state in which the driven gear and the drive shaft are connected to each other and a state in which the driven gear and the drive shaft are not connected to each other.

5. The drive device according to claim 4, further comprising:
a second brake that is configured to selectively make a changeover between a state in which the ring gear is fixed to the fixation member and a state in which the ring gear is not fixed to the fixation member.

6. The drive device according to claim 1, further comprising:
a hollow shaft that is configured to connect the first rotating electrical machine and the first sun gear to each other and that is hollow;
a connection shaft that is passed through an interior of the hollow shaft and that is connected to the carrier, and
a propeller shaft that is mechanically connected to the drive shaft, wherein the first clutch is configured to selectively make a changeover between a state in which the first sun gear and the engine are connected to each other via the hollow shaft and a state in which the first sun gear and the engine are not connected to each other via the hollow shaft, the second clutch is configured to selectively make a changeover between a state in which the carrier and the engine are connected to each other via the connection shaft and a state in which the carrier and the engine are not connected to each other via the connection shaft, and the propeller shaft and the connection shaft are arranged such that a center of an axis of the propeller shaft coincides with a center of an axis of the connection shaft.

7. The drive device according to claim 1, further comprising:
a third clutch that is configured to selectively make a changeover between a state in which the ring gear and the drive shaft are connected to each other and a state in which the ring gear and the drive shaft are not connected to each other.

8. The drive device according to claim 7, further comprising:
a second brake that is configured to selectively make a changeover between a state in which the ring gear is fixed to the fixation member and a state in which the ring gear is not fixed to the fixation member.

* * * * *